(12) United States Patent
Satake et al.

(10) Patent No.: US 8,326,271 B2
(45) Date of Patent: Dec. 4, 2012

(54) MOBILE COMMUNICATION TERMINAL, PROGRAM, AND COMPUTER READABLE RECORDING MEDIUM

(75) Inventors: Masaomi Satake, Tokyo (JP); Masaru Fukushima, Tokyo (JP); Takashi Endoh, Yamato (JP); Yasuhiko Numagami, Kawasaki (JP); Fumihiro Nozaki, Yokohama (JP); Takeshi Yamane, Kawasaki (JP); Hiroshi Tsukiji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 959 days.

(21) Appl. No.: 12/236,390

(22) Filed: Sep. 23, 2008

(65) Prior Publication Data

US 2009/0054041 A1 Feb. 26, 2009

Related U.S. Application Data

(62) Division of application No. 11/554,424, filed on Oct. 30, 2006, which is a division of application No. 10/952,261, filed on Sep. 27, 2004.

(30) Foreign Application Priority Data

| Sep. 30, 2003 | (JP) | 2003-342040 |
| Sep. 30, 2003 | (JP) | 2003-342041 |
| Sep. 30, 2003 | (JP) | 2003-342043 |
| Sep. 30, 2003 | (JP) | 2003-342375 |
| Sep. 30, 2003 | (JP) | 2003-342376 |
| Sep. 30, 2003 | (JP) | 2003-342377 |
| Sep. 30, 2003 | (JP) | 2003-342378 |

(51) Int. Cl.
*H04M 1/663* (2006.01)

(52) U.S. Cl. ........... 455/412.2; 455/406; 455/407; 455/411; 455/413; 455/414.1; 455/417; 455/552.1; 455/90.1; 345/146; 345/352; 379/93.17; 379/93.23

(58) Field of Classification Search .......... 455/566, 455/575, 550, 464, 38.4, 567, 426.1, 93.17, 455/93.23; 379/93.17, 93.23; 345/146, 352; 370/242, 10.3; 709/227
See application file for complete search history.

(56) References Cited

U.S. PATENT DOCUMENTS 6,178,338 B1  1/2001  Yamagishi et al. ........... 455/566
(Continued)

FOREIGN PATENT DOCUMENTS

JP  06-152711  5/1994
(Continued)

OTHER PUBLICATIONS

Japanese language office action and its English language translation for corresponding Japanese application 2003342040 lists the references above.

(Continued)

*Primary Examiner* — Ajit Patel
*Assistant Examiner* — Fred Casca
(74) *Attorney, Agent, or Firm* — DLA Piper LLP (US)

(57) ABSTRACT

Information that is no longer valid due to the passage of time is not provided to a user. When a stock price information server acquires updated stock price information from a securities market network, a message that instructs that a predetermined application be started up and to which a term of validity has been attached is sent to a user terminal over a paging channel via an SMS server. When the user terminal receives the message, it determines whether or not the message is within the term of validity, and if it determines that the message is within the term of validity, starts up the instructed application from among a plurality of applications that are stored. The stock price information server then sends to the user terminal the stock price information that is requested by the started up application.

4 Claims, 36 Drawing Sheets

U.S. PATENT DOCUMENTS

| | | |
|---|---|---|
| 6,195,543 B1 | 2/2001 | Granberg |
| 6,744,423 B2 | 6/2004 | Kraft et al. |
| 7,019,646 B1 | 3/2006 | Woodard et al. |
| 7,190,949 B2 | 3/2007 | Tsuda et al. |
| 7,245,901 B2 | 7/2007 | McGregor et al. |
| 7,340,057 B2 | 3/2008 | Martin, Jr. et al. |
| 7,577,904 B1 | 8/2009 | Obilisetty |
| 2001/0014909 A1 | 8/2001 | Yoshida |
| 2001/0051884 A1 | 12/2001 | Wallis et al. |
| 2002/0010785 A1 | 1/2002 | Katsukawa et al. |
| 2002/0077170 A1 | 6/2002 | Johnson et al. |
| 2002/0102967 A1 | 8/2002 | Chang et al. ............ 455/414 |
| 2002/0111153 A1 | 8/2002 | Hartmaier et al. |
| 2003/0011645 A1 | 1/2003 | Spencer, II |
| 2003/0023849 A1 | 1/2003 | Martin, Jr. et al. |
| 2003/0030671 A1 | 2/2003 | Cobb et al. |
| 2003/0060187 A1 | 3/2003 | Mattila et al. |
| 2003/0095102 A1 | 5/2003 | Kraft et al. |
| 2003/0096625 A1 | 5/2003 | Lee et al. |
| 2003/0097444 A1 | 5/2003 | Dutta et al. |
| 2003/0211872 A1 | 11/2003 | Meins et al. |
| 2004/0002355 A1 | 1/2004 | Spencer, II |
| 2004/0010685 A1 | 1/2004 | Sakaguchi et al. |
| 2004/0049574 A1 | 3/2004 | Watson et al. |
| 2004/0155901 A1 | 8/2004 | McKee et al. |
| 2004/0179033 A1 | 9/2004 | Yu et al. |
| 2004/0193813 A1 | 9/2004 | Nguyen et al. |
| 2004/0266414 A1 | 12/2004 | Likwornik |
| 2005/0044191 A1 | 2/2005 | Kamada et al. |
| 2005/0055350 A1 | 3/2005 | Werme et al. |
| 2005/0066283 A1 | 3/2005 | Kanamaru ............ 715/49 |
| 2005/0102205 A1 | 5/2005 | Yamamoto et al. |
| 2005/0102422 A1 | 5/2005 | Yamamote et al. |
| 2005/0130631 A1 | 6/2005 | Maguire et al. |
| 2005/0187883 A1 | 8/2005 | Bishop et al. |
| 2006/0129628 A1 | 6/2006 | Kamiya et al. |
| 2008/0066089 A1 | 3/2008 | Kamiya et al. |

FOREIGN PATENT DOCUMENTS

| | | |
|---|---|---|
| JP | 07-226798 | 8/1995 |
| JP | 08-228220 | 9/1996 |
| JP | 09-083681 | 3/1997 |
| JP | 10164248 A | 6/1998 |
| JP | 11212894 A | 8/1999 |
| JP | 11296425 A | 10/1999 |
| JP | 11338519 A | 12/1999 |
| JP | 2000-022788 | 1/2000 |
| JP | 2000020465 A | 1/2000 |
| JP | 2000-078129 | 3/2000 |
| JP | 2000-078192 | 3/2000 |
| JP | 2000-276416 | 10/2000 |
| JP | 2000278312 A | 10/2000 |
| JP | 2001-078078 | 3/2001 |
| JP | 2001-101064 | 4/2001 |
| JP | 2001167012 A | 6/2001 |
| JP | 2001-309074 | 11/2001 |
| JP | 2002-033822 | 1/2002 |
| JP | 2002032216 A | 1/2002 |
| JP | 2002-077438 | 3/2002 |
| JP | 2002-125221 | 4/2002 |
| JP | 2002145281 A | 5/2002 |
| JP | 2002-190847 | 7/2002 |
| JP | 2002-223271 | 8/2002 |
| JP | 2002-320025 | 10/2002 |
| JP | 2002344529 A | 11/2002 |
| JP | 2003-008738 | 1/2003 |
| JP | 2003-046601 | 2/2003 |
| JP | 2003091679 A | 3/2003 |
| JP | 2003114852 A | 4/2003 |
| JP | 2003-143332 | 5/2003 |
| JP | 2003134566 A | 5/2003 |
| JP | 2003140788 A | 5/2003 |
| JP | 2003149317 A | 5/2003 |
| JP | 2003-198716 | 7/2003 |
| JP | 2003-204384 | 7/2003 |
| JP | 2003189357 A | 7/2003 |
| JP | 2003244653 A | 8/2003 |
| JP | 2003-263251 | 9/2003 |
| JP | 2003256062 A | 9/2003 |
| WO | 03048926 A1 | 6/2003 |

OTHER PUBLICATIONS

Japanese language office action and its English language translation for corresponding Japanese application 2003342378 lists the references above.

Chinese language office action and its English language translation for corresponding Chinese application 200710006711 lists the references above.

Japanese language office action and its English language translation for corresponding Japanese application 2003342376 lists the references above.

Office action dated Apr. 14, 2011 for related U.S. Appl. No. 11/832,535.

Office action dated Sep. 29, 2011 for related U.S. Appl. No. 10/952,261 cites the U.S. patent above.

Japanese language appeal decision dated Jul. 26, 2011 and its English language translation for corresponding Japanese application 2003342378.

Japanese language office action dated Feb. 5, 2008 and its English language translation for corresponding Japanese application 2003342378.

U.S. office action dated Dec. 7, 2011 for related U.S. Appl. No. 12/016,879 cites the U.S. patent application publications and foreign patent document above.

Japanese language office action dated Feb. 5, 2008 and its English language translation for corresponding Japanese application 2003342041.

Japanese language office action dated Feb. 5, 2008 and its English language translation for corresponding Japanese application 2003342375.

Japanese language office action dated Feb. 5, 2008 and its English language translation for corresponding Japanese application 2003342377.

Office Action dated Mar. 18, 2011 for U.S. Appl. No. 10/952,261 cites the reference above.

Japanese language office action and its English language translation for corresponding Japanese application 2003342043 lists the references above.

U.S. office action dated Nov. 23, 2011 for related U.S. Appl. No. 11/832,535 cites the U.S. Patent Application Publication above.

Chinese language office action dated Apr. 13, 2012 and its English language translation issued in corresponding Chinese application 2009102245321.

U.S. advisory action dated Mar. 12, 2012 issued in related U.S. Appl. No. 11/832,535.

Japanese language office action (appeal decision) dated Mar. 8, 2011 and its English language translation for corresponding Japanese application 2003342041 cites the foreign patent documents above.

Japanese language office action dated Mar. 22, 2011 and its English language translation for corresponding Japanese application 2008301440.

Office action dated Apr. 14, 2011 for related U.S. Appl. No. 11/832,515.

FIG. 2

| STOCK NAME | ○○○ |
|---|---|
| STOCK CODE | KYO |
| LAST UPDATE DATE AND TIME | 9/11  09:18 |
| TRADING PRICE | 7,630 |
| COMPARISON WITH PREVIOUS DAY | −170  −2.18% |
| INITIAL PRICE | 7,600 |
| HIGHEST PRICE | 7,650 |
| LOWEST PRICE | 7,600 |
| PREVIOUS DAY CLOSING PRICE | 7,600 |
| BID PRICE | 0 |
| ASKING PRICE | 0 |

TIME WHEN INFORMATION WAS UPDATED

RECORD STRUCTURE OF LOCAL STOCK PRICE DATABASE
(FOR A SINGLE STOCK)

FIG. 3

| USER NAME | TARO ○○○ |
|---|---|
| USER CODE | 001200741 |
| SMS ADDRESS | ○○○@△△△.××.jp. |
| LAST UPDATE DATE AND TIME | 9/11  09:00 |
| HELD STOCK 1 | 6971 |
| NUMBER OF STOCKS HELD | 1,000 |
| PURCHASE PRICE | 6,000,000 |
| TRADING PRICE | 7,600 |
| HELD STOCK 2 | 9433 |
| NUMBER OF STOCKS HELD | 100 |
| PURCHASE PRICE | 61,400,000 |
| · | · |
| · | · |

RECORD STRUCTURE OF USER DATABASE

FIG. 4

| | |
|---|---|
| USER CODE | 001200741 |
| STOCK NAME | ○○○ |
| DATE AND TIME | 9/11 09:18 |
| TRADING PRICE | 7,630 |
| COMPARISON WITH PREVIOUS DAY | -170 -2.18% |
| NUMBER OF STOCKS HELD | 1,000 |
| PURCHASE PRICE | 6,000,000 |
| PROFIT PER STOCK | 1,630 |
| INITIAL PRICE | 7,600 |
| HIGHEST PRICE | 7,650 |
| LOWEST PRICE | 7,600 |
| PREVIOUS DAY CLOSING PRICE | 7,600 |
| BID PRICE | 0 |
| ASKING PRICE | 0 |

TIME WHEN INFORMATION WAS UPDATED

IF THE NUMBER OF STOCKS HELD HAS BEEN RECORDED
IF THE PURCHASE PRICE HAS BEEN RECORDED
AUTOMATICALLY CALCULATED FROM THE ABOVE INFORMATION

UPDATED PRICE INFORMATION FOR USER

FIG. 5

| TO: | OOO@△△△.××.jp. |
|---|---|
| (TEXT) | 0x00. 0x11 |
| | EXEC:0010-0001 |
| | PARM:-USER 001200741 |
| | UNTL:0309111150000 |

ADDRESS

BINARY CODE SHOWING MAIL IS A SPECIAL MESSAGE

APPLICATION UPDATING STOCK PRICE INFORMATION
AND PARAMETERS (USER IDENTIFIER) THEREOF
TERM OF VALIDITY OF THIS MAIL

FIG. 6

| | |
|---|---|
| TO: | ○○○@△△△.××.jp. |
| TIME | 2003/9/11 9:18:00 |
| (TEXT) | 0x00.0x11 |
| | EXEC:0010-0001 |
| | PARM:-USER 001200741 |
| | UNTL:0309111150000 |

ADDRESS
TIME MAIL IS RECEIVED BY SMS SERVER. RECORDED BY SMS SERVER.
BINARY CODE SHOWING MAIL IS A SPECIAL MESSAGE
APPLICATION UPDATING STOCK PRICE INFORMATION
AND PARAMETERS(USER IDENTIFIER) THEREOF
TERM OF VALIDITY OF THIS MAIL

SMS MESSAGE RECEIVED BY TERMINAL

PROCESSING AT SMS MESSAGE RECEPTION

| TYPE CODE | APPLICATION CODE | RUN FILE |
|---|---|---|
| 0010 | 0001 | STRENEW |
| 0014 | 0001 | WEDRNEW |
| 0011 | 0001 | ALARM |
| ⋮ | ⋮ | ⋮ |

APPLICATION LIST

CALCULATION FLOW OF STARTUP VALIDITY TIME

FIG. 10
| TYPE NO | TERM OF VALIDITY | REMARKS |
|---|---|---|
| 0001 | (NO ENTRY) | MAIL SERVICE |
| 0010 | 6 HOURS | STOCK PRICE SERVICE |
| 0011 | 1 HOUR | ALARM SERVICE |
| 0014 | 12 HOURS | WEATHER SERVICE |
APPLICATION TYPE LIST
FIG. 11
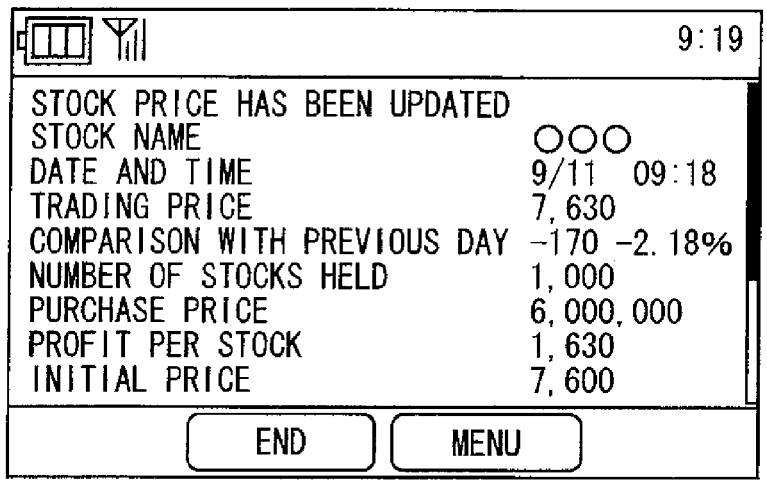
UPDATE NOTIFICATION SCREEN
FIG. 12
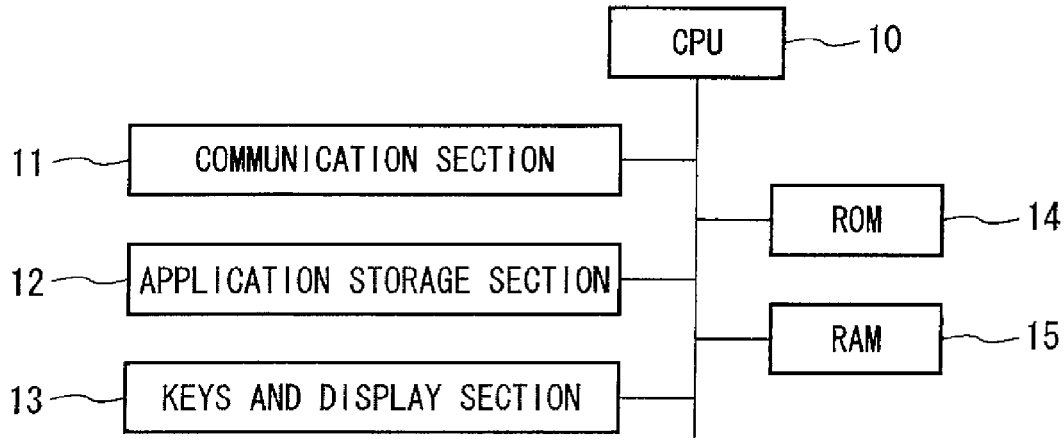

SMS LAUNCHER OPERATION SEQUENCE

EXAMPLE OF THE DATA STRUCTURE OF AN SMS MESSAGE

EXAMPLE OF SMS MESSAGE DISPLAY

DIAGRAM OF A NETWORK STRUCTURE

FIG. 20

| ROW A | ROW B | ROW C | ROW D |
|---|---|---|---|
| APPLICATION NUMBER | APPLICATION NAME | AUTOMATIC STARTUP SETTING FOR NORMAL OPERATION | AUTOMATIC STARTUP SETTING FOR MANNER MODE |
| 00 | MAILER | ON | OFF |
| 01 | PLAYER | ON | OFF |
| 02 | CAMERA | ON | OFF |
| ... | ... | ... | ... |
| 10 | GPS | ON | ON |

ON: STARTUP AUTOMATICALLY
OFF: DO NOT STARTUP AUTOMATICALLY

STRUCTURAL EXAMPLE OF A DATABASE REQUIRED IN A UNIT THAT ANALYSES APPLICATION INFORMATION

FIG. 22A
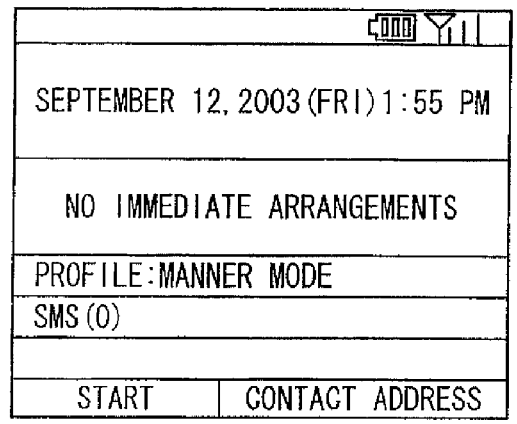
WAIT DISPLAY
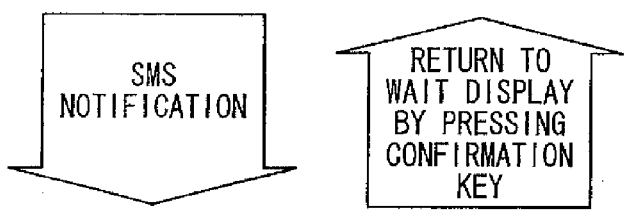
FIG. 22B
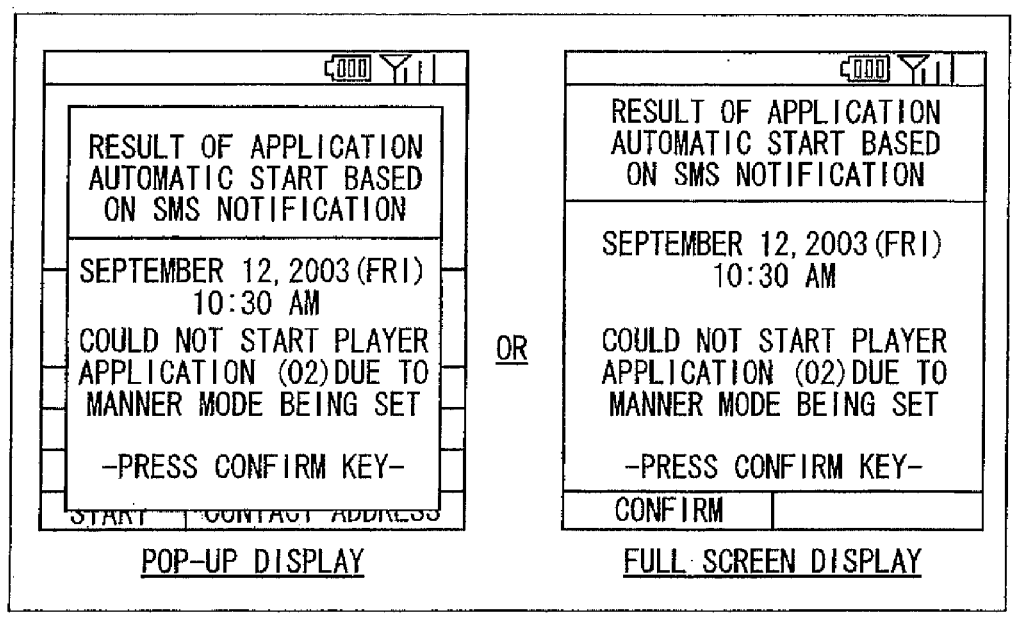
EXAMPLE OF SCREEN DISPLAY WHEN SMS NOTIFICATION IS MADE IN MANNER MODE

STRUCTURAL DIAGRAM OF PORTABLE COMMUNICATION TERMINAL

FIG.25

EXAMPLE OF APPLICATION INFORMATION

| ID | APPLICATION | AUTOMATIC STARTUP | CHARGE | CHARGE AMOUNT |
|---|---|---|---|---|
| 1 | MAILER | YES | YES | ¥10 |
| 2 | BROWSER | NO | YES | ¥30 |
| 3 | PLAYER | YES | NO | ¥0 |
| 4 | GAME | NO | YES | ¥100 |

FIG.26

NOTIFICATION CONDITIONS MATRIX

| | SETTING OF NOTIFICATION RELATING TO APPLICATION STARTUP IS PRESENT | SETTING OF NOTIFICATION RELATING TO APPLICATION STARTUP IS NOT PRESENT |
|---|---|---|
| REACHES UPPER LIMIT OF ACCUMULATED COMMUNICATION CHARGE AMOUNT | NOTIFY THAT APPLICATION WAS NOT STARTED UP | NOTIFY THAT APPLICATION WAS NOT STARTED UP |
| DOES NOT REACH UPPER LIMIT | NOTIFY THAT APPLICATION WAS STARTED UP | MAKE NO NOTIFICATION |

FIG. 27

EXAMPLE OF EXTENSION OF APPLICATION INFORMATION

| ID | APPLICATION | AUTOMATIC STARTUP | CHARGE | CHARGE AMOUNT | UPPER LIMIT CHECK | PRIORITY | ACCUMULATED CHARGE AMOUNT |
|---|---|---|---|---|---|---|---|
| 1 | MAILER | YES | YES | ¥10 | ON | MAXIMUM | ¥500/MONTH |
| 2 | BROWSER | NO | YES | ¥30 | OFF | MEDIUM | ¥3,000/MONTH |
| 3 | PLAYER | YES | NO | ¥0 | ON | MEDIUM | — |
| 4 | GAME | YES | YES | ¥100 | ON | LOW | ¥1,000/MONTH |

| 2003/9/10 11:00 |
| E-MAIL RECEPTION SERVICE |
| 2003/9/10 11:00 |
| INVENTORY MANAGEMENT DATA |
| 2003/9/10 11:01 |
| STOCK PRICE MOVEMENT |
| 2003/9/10 11:01 |
| CRIME PREVENTION SYSTEM NOTIFICATION |
| STARTUP | CANCEL |

MOBILE COMMUNICATION TERMINAL

| APPLICATION |
| STARTUP RESPONSE ENGINE |
| STARTUP RESPONSE DRIVER |
| OS |
| HARDWARE |
| COMMUNICATION ADAPTOR |

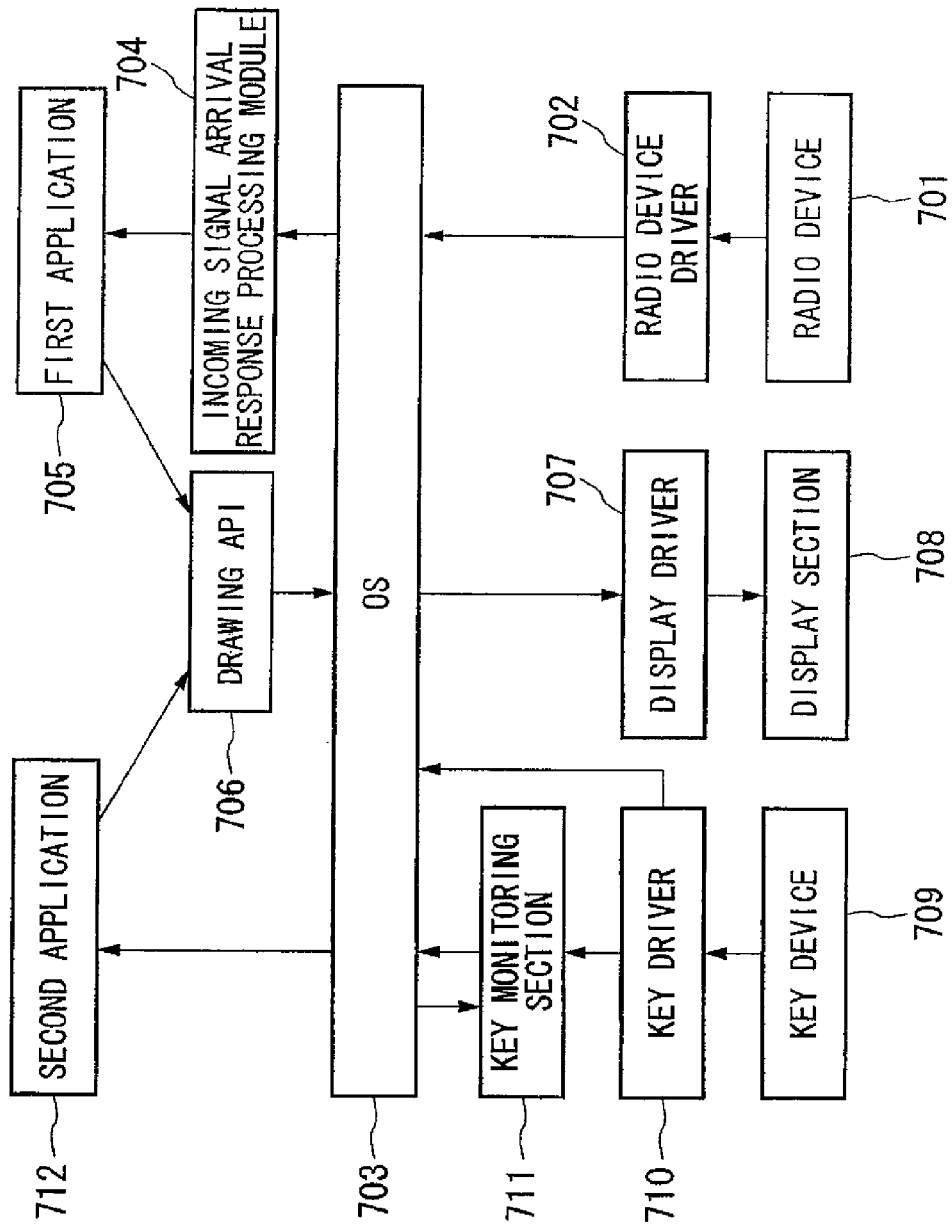

FIG. 42A
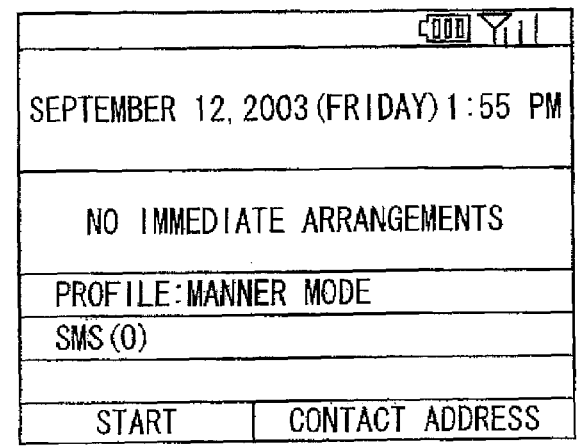
WAIT DISPLAY
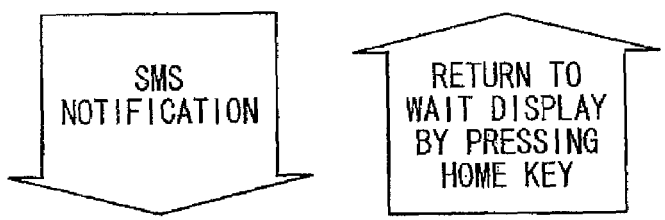
FIG. 42B
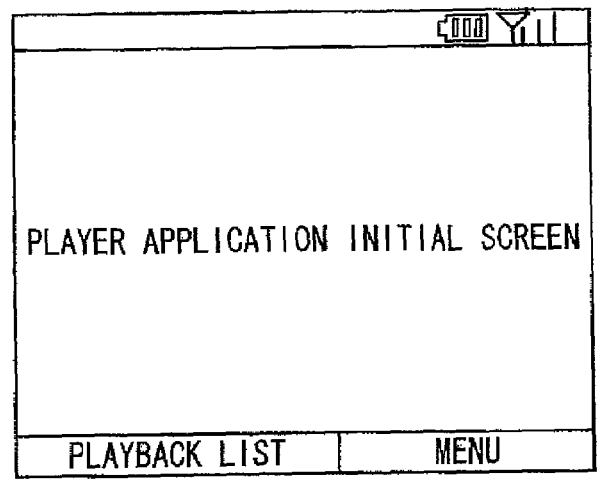
APPLICATION STARTUP DISPLAY
EXAMPLE OF A (CONVENTIONAL) DISPLAY SCREEN DURING SMS NOTIFICATION EXECUTION IN MANNER MODE

MOBILE COMMUNICATION TERMINAL, PROGRAM, AND COMPUTER READABLE RECORDING MEDIUM

CROSS-REFERENCE TO THE RELATED APPLICATIONS

This is a divisional of application Ser. No. 11/554,424 filed Oct. 30, 2006, which is a divisional of application Ser. No. 10/952,261 filed Sep. 27, 2004, the entire contents of which are incorporated herein by reference. This application also claims benefit of priority under 25 U.S.C. §119 to Japanese Patent Application Nos. 2003-342040, 2003-342041, 2003-342043, 2003-342375, 2003-342376, 2003-342377 and 2003-342378 all filed Sep. 30, 2003, the entire contents of all of which are incorporated herein by reference.

BACKGROUND OF THE INVENTION

1. Field of the Invention

The present invention relates to a mobile communication terminal such as a mobile telephone that is capable of receiving messages, and to an information providing system that is provided with this mobile communication terminal and with a server, and in which the server commands the startup of applications held by the mobile communication terminal, and to a program that is used by the mobile communication terminal, and also to a recording medium that can be read by a computer and on which this program can be recorded.

In particular, the present invention relates to a mobile communication terminal that has a function of receiving a PUSH type message such as short message service (SMS) messages and starting an application using an application startup command included in the message, a function of playing games, a function of creating mail, or a function of inputting character strings by key operation, an information providing system, a program, and a computer readable recording medium Priority is claimed on Japanese Patent Application Nos. 2003-342040, 2003-342041, 2003-342043, 2003-342375, 2003-342376, 2003-342377, and 2003-342378, filed Sep. 30, 2003, the contents of which are incorporated herein by reference.

2. Description of Related Art

A system known as e-mail that is conducted via the Internet is widely used as a mail using a personal computer (PC) or mobile telephone or the like. In e-mail, mail that is transmitted from a transmitting terminal is temporarily stored in a mail server, and a receiving terminal accesses the mail server and inquires whether or not newly arrived mail is present at its own address. If new mail is present, the receiving terminal requests that this mail be transferred to the receiving terminal. Accordingly, regardless of whether or not newly arrived mail is present, it is necessary for the receiving terminal to conduct a certain amount of communication in order to make an inquiry to the mail server, thereby creating the problem of poor efficiency.

In contrast, in a mobile telephone, PUSH type messages (referred to below as "PUSH messages" or simply as "messages") that are transmitted via control channels are used as notification of newly arrived e-mail. The name of the service differs depending on the company; however, this system is generally known as SMS. SMS is a system for transmitting and receiving short messages, and messages such as mail are transmitted via control channels that are known as paging channels from an SMS server to a receiving terminal such as a mobile telephone. For example, in the case of a CDMA system for mobile telephone, SMS are transmitted using data burst messages over paging channels that are used in the control of mobile stations and the like. The SMS is used as notification of newly arrived e-mail. In this case, if the receiving terminal is within the range of the communication service, and is in a state in which reception is possible (i.e., a state in which the service can operate), when an e-mail arrives in the SMS server via an e-mail server, notification of this reception is immediately transferred to the receiving terminal as a PUSH message, and the receiving terminal is able to receive this notification and automatically acquire the newly arrived e-mail. Accordingly, the user does not need to periodically make access from a terminal in order to confirm whether or not e-mail has arrived, and there is no need to conduct unnecessary communication to make an inquiry, as is the case with e-mail. However, because the control channel has a small transmission capacity, message is limited to short messages of approximately 100 bytes.

Note that SMS is disclosed in Japanese Unexamined Patent Application, First Publication No 2002-320025.

In Japan, SMS is commonly used for giving notification of newly arrived e-mail, however, it is also used in application automatic startup systems such as those described below. Examples of such application automatic startup systems include systems that designate a specific application in order to operate the function of a camera or player or the like that is held by a mobile communication terminal such as a mobile telephone so as to automatically start up that application from another terminal such as a mobile telephone or a PC using these SMS messages.

Moreover, in a system that transmits data to a mobile communication terminal such as a mobile telephone using a server, a message that relates to data delivered to the mobile telephone is transmitted from the server. In response to this message, the mobile telephone starts up the application that corresponds to the message. As a result of the started application making a request to the server for the delivery of data, the data held by the mobile telephone is updated, and the mobile telephone can receive the latest data at a suitable opportunity.

An example of this type of application automatic startup system includes an information providing server system that provides a variety of information (i.e., contents), for example, information that changes from moment to moment such as stock price information, news, and weather forecast information to a mobile communication terminal using PUSH messages.

Namely, the mobile communication terminal of a user (referred to below as a "user terminal") stores several applications in order to receive the aforementioned variety of information. When a server acquires new information such as stock price information for a user, in order to make a PUSH delivery periodically of information showing that this stock price information has been updated, the server creates a PUSH message instructing that an application be started up, from among the applications held by the user terminal, that receives this stock price information, and transmits this PUSH message to the user terminal using the SMS. When the user terminal receives the PUSH message, it automatically starts up an application, such as a World Wide Web (WWW) browser or a newsreader, that is instructed by the received message and makes a request to the server for that stock price information or the like. The server then transmits data containing the stock price information or the like to the user terminal. As a result of the user terminal acquiring updated information in this manner, the user is able to view stock prices, news, weather forecasts or the like at the time when this information is updated.

According to an information providing system that is based on this type of application startup, a user is able to automatically receive desired information from a server and display this information without having to perform any sort of operation.

In addition, a map information providing system has also been proposed as an application automatic startup system. This map information providing system enables a mobile telephone to receive PUSH type SMS and download a map.

There are also conventional PUSH data delivery systems such as those shown in FIG. 37 and FIG. 38.

FIG. 37 is a system structural view of such a PUSH data delivery system and shows an example of the use thereof in a crime prevention system.

In FIG. 37, when a call server 1021 confirms the update of data that is to be delivered, it transmits a message containing information showing that type of data being delivered to a mobile communication terminal 1022. The mobile communication terminal 1022 has a response unit that switches to a state in which data is able to be transmitted or received in response to the call from the call server 1021, a data type detection unit that detects the type of data, and an application startup unit that starts up an application that corresponds to the type of data. FIG. 38 is a conceptual view of the structure of the mobile communication terminal 1022.

When a camera device 1023 detects an abnormality it notifies the call server 1021 that an abnormality has occurred and also provides image information at the time the abnormality occurred. The call server 1021 uploads the image information via the Internet 1024 to a WEB server 1025 and, at the same time, sends a message to the mobile communication terminal 1022 notifying it that image information has been updated. The mobile communication terminal 1022 analyzes received messages, starts up related applications, accesses the WEB server 1025, and downloads the image information at the time the abnormality occurred that was uploaded to the WEB server 1025.

In this way, the user of the mobile communication terminal 1022 is able to confirm the situation when an abnormality has occurred without constant monitoring of a dedicated terminal by using the display of a mobile communication terminal.

Services that use PUSH data delivery systems include the automatic reception of e-mail and the automatic updating of databases such as inventory management databases. As in the case of the above system, by providing the mobile communication terminal with a data type detection unit and an application startup unit, it is possible to receive a plurality of data delivery services simultaneously.

Conventionally, mobile telephones have been developed that incorporate game functions and mail creation functions. Using these types of mobile telephones, a user has been able to perform operations continuously for an extended period of time in order to play games or create mail text even while waiting for the arrival of an incoming signal. Accordingly, if an incoming signal arrives while the user is operating the mobile phone, the image display from the operations performed until that time is suddenly interrupted and the screen display is altered to a screen display giving notification of an incoming call. Incoming signals include incoming signals relating to the reception of short messages and e-mails in addition to telephone calls, and a screen display is switched in the same way.

In particular, when the aforementioned SMS is a service that specifies an application held by the mobile phone relating to identification information stored in a short message, and then automatically starts up that application, in some cases what is displayed on the screen is not notification of an incoming signal but is notification relating to an application that is started up by an incoming signal. For example, what is displayed on the screen may be notification that an application has started up, notification that an application has ended, notification that an error occurred during the execution of the application, or notification that an application requires input from a user.

In order to avoid the annoyance felt when a game or the creation of a mail text message is interrupted by a notification of the arrival of an incoming signal or the like that is generated unintentionally, some conventional mobile telephones (for example, see Japanese Unexamined Patent Application, First Publication No. 2002-223271) have been provided with a mode for stopping the wait operation of the arrival of an incoming signal so that the arrival of an incoming signal is not generated during a game. FIG. 39 shows an outline of the operation flow of this mobile telephone.

In FIG. 39, while waiting, music playback is instructed by a user in processing step S1101, and is commenced. Next, when an incoming call signal is received in processing step S1102, a determination is made in determination processing step S1103 as to whether or not a flag F has been set. This flag F shows whether or not the mobile telephone is in wait operation stop mode. If the flag F has been set (i.e., if F=1), then an operation to notify of the arrival of an incoming signal is prohibited by processing step S1104. Next, in processing step S1105, the end of the playing music is awaited. When the music ends, in processing step S1106, a notification is made by displaying the fact that an incoming signal has arrived, and the routine is ended.

In determination processing step S1103, if the flag F is reset (i.e., if F=0), processing step S1107 is carried out. In processing step S1107, in the same way as for a normal arrival of an incoming signal, a notification may be displayed on the screen, or a notification may be made by playing a melody showing the arrival of an incoming signal, or a notification may be made by driving a vibrator. Consequently, if the user performs an off-hook operation, conversation processing is performed in processing step S1108, and an on-hook operation is awaited in processing step S1109. When the on-hook operation is detected, in processing step S1110, the mobile telephone is restored to a state in which music is able to be played back, and the routine is ended.

Furthermore, conventionally, if the arrival of an incoming signal is detected while a game is being run, a method in which notification of the arrival of the incoming signal is not given, and a method in which the game data is stored in a memory and notification of the arrival of the incoming signal is given, and the game can then be subsequently recommenced have been proposed.

Conventionally, mobile telephones that have a Japanese language input function for applications such as creating the text of an e-mail are widely used. Mobile telephones are provided with numerical keys for 0 to 9 as well as the two # and * keys. However, it is difficult to input Japanese language using these keys, and a large number of key operations are necessary. While inputting Japanese language is naturally difficult, it is also difficult to input character strings of English, which has fewer types of characters. Because of this, a function in which a plurality of candidates for the character string to be input are displayed in response to key operations, and the character string to be input is selected from among these candidates by performing a setting operation is required in mobile telephones for each of the world's languages, including English. When Japanese language is input, there are a large number of homonyms. Therefore, in a personal computer, a function in which a plurality of candidates for the character string to be input are displayed, and the character string to be input is set from among these candidates by performing a setting operation is typically used. Naturally, this capability is also required in the Japanese language input function of a mobile telephone.

The following is an example of a mobile telephone having this type of Japanese language input function (see Japanese Unexamined Patent Application, First Publication No. H06-152711).

Next, a description will be given using an example of a conventional mobile telephone having a Japanese language input function.

This type of device is provided with keys arranged in the manner shown in FIG. 40. Five katakana alphabet symbols (i.e., the square form of the Japanese alphabet) for "A I U E O" are allocated to the key 901 of the number 1. In the same way, the katakana alphabet symbols for "KA KI KU KE KO" are allocated to the key of the number 2, the katakana alphabet symbols for "SA SI SU SE SO" are allocated to the key of the number 3, the katakana alphabet symbols for "TA TI TU TE TO" are allocated to the key of the number 4, the katakana alphabet symbols for "NA NI NU NE NO" are allocated to the key of the number 5, the katakana alphabet symbols for "HA HI HU HE HO" are allocated to the key of the number 6, the katakana alphabet symbols for "MA MI MU ME MO" are allocated to the key of the number 7, the katakana alphabet symbols for "YA YU YO" are allocated to the key of the number 8, the katakana alphabet symbols for "RA RI RU RE RO" are allocated to the key of the number 9, and the katakana alphabet symbols for "WA WO N" are allocated to the key of the number 0. In addition to these, a conversion key 902 and a set key 903 are provided.

For example, in order to input "Tokyo" in Japanese kanji characters (i.e., the Chinese character used in Japanese writing), the katakana alphabet symbols for "TOUKIYOU" are specified. The katakana alphabet symbol for "TO" corresponds to the key of the number 4. In the same way, the katakana alphabet symbol for "U" corresponds to the key 901 of the number 1, the katakana alphabet symbol for "KI" corresponds to the key of the number 2, the katakana alphabet symbol for "YO" corresponds to the key of the number 8, and the katakana alphabet symbol for "U" corresponds to the key 901 of the number 1. Therefore, if "41281" is input and the conversion key 902 is pressed, the candidate "TOUKIYOU" is displayed in katakana alphabet symbols. If the conversion key 902 is pressed again, "Tokyo" is displayed in Japanese kanji characters. If the set key 903 is pressed here, the word "Tokyo" written in Japanese kanji characters is set.

In FIG. 41, the transition of the display of character strings on the screen as a result of the above-described operation is shown by states 910 to 918.

In FIG. 41, immediately after the numerical keys have been pressed in sequence from a state 910 in which the input of the character string of "tomorrow" which is written in Japanese kanji characters has been set, the numbers are displayed in the character string input area on the screen (states 911 to 915). If the conversion key 902 is then pressed, these numbers are converted into katakana alphabet symbols (state 916). Other Japanese words correspond to the number string "41281" in addition to the katakana alphabet symbols for "TOUKIYOU". For example, the kanji symbol for "durability" corresponds to the katakana alphabet symbols for "TAIKIYUU", the kanji symbols for "ninth" and "compensatory holiday" correspond to the katakana alphabet symbols for "DAIKIYUU", the kanji symbol for "prenatal care of an unborn child" corresponds to the katakana alphabet symbols for "TAIKIYOU", the kanji symbols for "worst luck" and "DAIKYO" (which is the name of a company) correspond to the katakana alphabet symbols for "DAIKIYOU", the kanji symbols for "work strike" and "large undertaking" correspond to the katakana alphabet symbols for "TAIGIYOU", the kanji symbols for "search", "pursuit", and "investigation" correspond to the katakana alphabet symbols for "TUIKIYUU", the kanji symbols for "low-class", "regular holiday", and "tennis" correspond to the katakana alphabet symbols for "TEIKIYUU", the kanji symbols for "supply" and "imperial capital" correspond to the katakana alphabet symbols for "TEIKIYOU", the kanji symbols for "grade", "TOKYU" (which is the name of a department store) and "to throw a ball" correspond to the katakana alphabet symbols for "TOUKIYOU", the kanji symbol for "same grade" corresponds to the katakana alphabet symbols for "DOUKIYUU", the kanji symbol for "bullfighting" corresponds to the katakana alphabet symbols for "TOUGIYUU", the kanji symbols for "the same province", "Taosim", and "copper mirror" correspond to the katakana alphabet symbols for "DOUKIYOU", and the kanji symbol for "same profession" corresponds to the katakana alphabet symbols for "DOUGIYOU". Note that because the katakana alphabet symbol for "DA" is a combination of the katakana symbol for "TA" plus a voiced sound symbol indicating a voiced consonant, instead of the katakana for "DA" the katana for "TA" is input. In the same way, because the katakana alphabet symbol for "DO" is a combination of the katakana symbol for "TO" plus a voiced sound symbol indicating a voiced consonant, instead of the katakana for "DO" the katana for "TO" is input. By repeatedly pressing the conversion key 902, these are displayed consecutively on the screen. Finally, by pressing the set key 903, the kanji symbol for "Tokyo" are set (state 918).

In the above-described application automatic startup system, the following problem has existed. For example, when the user terminal goes outside the range covered by the communications service, or when the power is turned off, that is, when the user terminal is placed in a state in which it is unable to receive, then even if the server acquires new information and instructs the startup of an application using an SMS message to the user terminal, the application cannot be started up as the user terminal is unable to receive the SMS message. Thereafter, when the user terminal moves again back into the range of the communication service, or when the power is turned on, that is, when the user terminal is placed in a state in which it is able to receive, the SMS message is received, the application is started up, and the information is acquired and displayed. In this case, there is a possibility that the information required by the server has decreased in value or has become valueless during the time that the user terminal was in a state of being unable to receive. For example, because stock price information is updated at regular times, even if the user terminal once again becomes able to receive, and does receive an SMS message, and an application is started up, only old stock price information from prior to the latest update is acquired.

When a user terminal starts up an application based on the delayed receipt of an SMS message and acquires information having a term of validity, the following problems have existed.

(a) Resources of the user terminal are consumed needlessly in order to acquire information that is no longer valid.
(b) Resources of the network are consumed needlessly in order to acquire information that is no longer valid.
(c) Resources of the server are consumed needlessly for error processing or in order to acquire information that is no longer valid.

Furthermore, in an application automatic startup system based on the above-described conventional technology, the following problems have existed.

When a message is received and an application of a mobile telephone is started up using an application startup command included in the message, if the message attempts to start up an application that has not been installed on the mobile telephone, the startup cannot be achieved and fails. However, the message content needs to be resent many times over, and depending on the service a great deal of data may be sent. Consequently, the load on the mobile telephone is huge and causes great inconvenience to the user.

When the application is an application with a term of validity attached, such as a shareware application, and this term of validity has expired, the application cannot start up even if the message is transmitted.

As long as a user or service provider that is transmitting the message does not stop the service, a message attempting to start up an application that is not installed on the mobile telephone continues to be sent.

Moreover, in order to stop the service of an application that is not installed on a mobile telephone, the user needs to perform bothersome tasks such as tracing WEB pages to visit the WEB page of the cancellation setting screen of the service provided using a browser, or finding out the telephone number of the service provider and telephoning them.

Moreover, if an attempt is made to download an application that is not installed on the mobile telephone, it is necessary to trace WEB pages to visit the WEB page showing the download screen of the service provider using a browser.

Furthermore, if the continuing use of an application whose term of validity has expired is desired, it is necessary to trace WEB pages to visit the WEB page showing the download screen of the service provider using a browser.

Furthermore, in the case of a mobile telephone that displays a warning on the screen using a popup window, for example, when the mobile telephone returns from outside the service region to within the service region, if the plurality of SMS messages that have accumulated in the server up until that point are received and a plurality of the applications that correspond to these SMS messages cannot be started up, then due to the nature of a mobile telephone, the problems arise that it is not possible to display a large number of popup windows showing warnings, and that if a user closes the popup windows, information advising of a failure of the startup of the applications cannot be confirmed at a later time.

Moreover, in an application automatic start-up system that uses the above-described conventional technology, if an SMS notification is received then the application is started up without any limitations thereon, even in a state in which the functions of the mobile communication terminal are restricted, such as manner mode (i.e., a mode that is set so as to enable the mobile telephone to be used with consideration given to others—for example, a mode in which no ring tone is given, but instead a vibration is generated by a vibrator) and drive mode (i.e., a mode in which a notification is made to the person making the call stating that due to the fact that the user is currently driving a car and thus the user is unable to answer the telephone, and in which the arrival of an incoming signal is recorded in an arrival history for incoming signals without a ring tone being given and conversation is ended), so that problems arise such as, for example, a ring tone being given.

FIG. 42A and FIG. 42B show examples of a conventional display screen when SMS notification is executed in manner mode.

If an SMS notification occurs during the display of the waiting screen shown in FIG. 42A, then, conventionally, regardless of whether the mobile telephone is in manner mode or not, the application is started up without any limitations thereon. As a result, an application startup display such as that shown in FIG. 42B is shown.

Moreover, in SMS, because only a small amount of data can be contained in a single message, only a summary of an information is delivered, and the details of the information is acquired later using a terminal at the logical location of that information (for example, a uniform resource locator (URL)). However, when that information is acquired, a series of actions such as:

1. receive SMS PUSH messages
   2. start up application
   3. acquire information (i.e., access network)

is automatically processed. When this happens, under a rate schedule such as a volume dependent charging system, the communication charge amount is continually increased by the frequency of the updates or the volume of information without the user being aware of it. Accordingly, there is a possibility that a high charge amount will be levied on the user. In addition, in future data communications services using mobile terminals, the volume of data that will be exchanged will increase as the data communication rate increases, so that the financial burden on the user will tend to increase.

Moreover, as the performance and functionality of mobile communication terminals such as mobile phones have improved in recent years, it may be considered that, in future, a variety of PUSH data delivery services will be provided in addition to notification services of crime prevention systems (see FIG. 37 and FIG. 38) and e-mail automatic reception services and the like.

If services continue to diversify in this way, and a user is able to receive a plurality of delivery services using a single mobile communication terminal, there is a possibility that a plurality of startup messages will be received simultaneously.

In particular, if a plurality of delivery servers transmit the aforementioned startup messages to a mobile communication terminal while the power supply of that mobile communication terminal is turned off, or while that mobile communication terminal is outside the communication service range (or if startup messages are transmitted from a single server for a plurality of services), when the power supply of the mobile communication terminal is turned back on or when the terminal returns from outside the service range to inside the service range, then a situation in which a plurality of messages are received substantially simultaneously in a short time could easily arise. In this case, if the mobile communication terminal processes the messages in the order that they are received, then the problem arises that the processing of a notification message having a high degree of urgency such as a notification from a crime prevention system may end up being put off until later.

Moreover, it is necessary that conventional mobile telephones in which the aforementioned game functions and mail text creation functions and the lie have been installed are provided with operation modes that include a mode for stopping the operation of a radio section and a game mode in the operation of the mobile telephone. These types of mode are easy to understand if the arrival of an incoming signal is to be completely denied, however, in actual applications, a user may wish to play a game while waiting for an incoming signal. In addition, it is difficult to understand an operation in which the creation of the text of a mail is performed in a mode for denying the arrival of incoming signals, and the radio section function of the mobile telephone is made usable only when the mail is to be sent, and the possibility exists that such operations will confuse a user.

Mobile telephone software has now appeared that is provided with a multiprocessing execution environment that is very similar to those used on desktop computers. In this type of software environment, it is not possible to make the clear-cut distinction that, the mobile telephone must be set to a game mode because an application is being run, and nor is it necessary to do so. In other words, it is taken for granted that an operation is possible in which a game or application currently being run is hid in the background while a task that has interrupted this game or application is processed, and that when this task has ended the interrupted game or application is recommenced.

In this way, if a game or application is being run while the arrival of an incoming signal is awaited, the conventional technology causes the problem that notification of the arrival of the incoming signal unexpectedly appears on the screen resulting in an operational error or a feeling of annoyance or surprise overcoming the user.

In addition, a conventional mobile telephone having a Japanese language input function displays character strings that are input in sequence during character input and that have not yet been set. If an incoming signal of a telephone arrives in the middle of an operation to select a character string from among a plurality of candidates, the problem has existed that the display switches to the screen for the notification of the arrival of an incoming signal and the thoughts of the user, which had been centered on the operation to select a character string, are interrupted. In particular, if the selection is being made from a large number of candidates, then because it is necessary to search for the desired character string by displaying the candidates sequentially, there is a comparatively high probability that an incoming signal will arrive during such a search and that the search will be interrupted. In addition, when the arrival of an incoming signal or telephone conversation ends, the display is restored to its original character input screen. In this case, however, the mobile telephone returns to its original state in which the candidates are displayed, or unset character strings are lost. Even if candidates had been displayed, the problem has existed that it may be difficult for a user to recall and continue his or her interrupted actions, and if unset character strings have been lost, the user must go to the trouble of repeating the key operation and candidate selection from the beginning.

SUMMARY OF THE INVENTION

The object of the present invention is to provide a mobile communication terminal, an information providing system, a program and a computer readable recording medium that achieve the aims stated below.

(a) information that is no longer valid due to the passage of time is not supplied to a user.
(b) if there is a failure in the startup of an application attempted in response to the receipt of an SMS message, a warning is given to a user.
(c) a particular application is not started up unexpectedly even if an SMS notification (an SMS message) is received in a state in which the functions of the mobile communication terminal are restricted.
(d) the prevention of an accumulated communication charge amount reaching a high figure without the knowledge of the user.
(e) if a large number of unprocessed startup messages are present, these are supplied to the user such that the user can deal with them in order of importance to the user.
(f) to reduce the operational errors or feelings of annoyance or surprise that are generated when a notification relating the arrival of an incoming call is displayed during the running of a game or application while the mobile communication terminal is waiting for the arrival of an incoming signal, and to improve user-friendliness.
(g) if unset character strings are displayed during a character input operation, no notification of the arrival of an incoming signal will be allowed to interrupt until the user has performed the setting operation.

The mobile communication terminal according to a first aspect of the present invention comprises: a receiving section that receives a message; a storage section that stores an application that requests a server for predetermined information and receives the information; and a determining section that, when the receiving section receives a message that instructs that a predetermined application be started up, determines whether or not a term of validity is attached to the message, and, based on the term of validity, starts up the instructed application that is stored in the storage section.

The information providing system according to the first aspect of the present invention comprises: a server that is provided with: a message transmitting section that transmits to a mobile communication terminal a message to which a term of validity is attached and that instructs that a predetermined application in the mobile communication terminal be started up; and an information transmitting section that transmits to the mobile communication terminal predetermined information that is requested by the started up application in the mobile communication terminal; and a mobile communication terminal that is provided with: a receiving section that receives a message instructing that an application transmitted by the server be started up; a storage section that stores an application that requests the server for predetermined information and receives the information; a control section that, when the receiving section receives the message, determines whether or not a term of validity is attached to the message, and, based on the term of validity, starts up the instructed application from among the applications that are stored in the storage section.

The program according to the first aspect of the present invention executes on a computer: a reception process that receives a message; a determination process that, when a message that instructs that a predetermined application be started up is received by the reception process, determines whether or not a term of validity is attached to the message; and an application startup process that, based on the term of validity, starts up the instructed application that is stored.

According to the first aspect of the present invention, because information that is no longer valid is not acquired by the mobile communication terminal, it is possible to prevent the resources of a mobile terminal, a network, or a server being consumed needlessly, and to achieve an efficient information providing service.

The mobile communication terminal according to a second aspect of the present invention comprises: a receiving section that receives a message instructing that an application be started up; a startup section that starts up a relevant application based on the received message; and a creating section that, when the startup section is unable to start up the relevant application, creates information advising of that fact as message data.

The program according to the second aspect of the present invention executes on a computer: a reception process that receives a message instructing that an application be started up; a startup process that starts up a relevant application based on the message received by the reception process; and a message creation process that, when the relevant application cannot be started up in the startup process, creates information advising of that fact as message data.

According to the second aspect of the present invention, if a message such as an SMS message is received and there is a failure in the startup of an application, information showing that fact is created as message data. As a result, it is possible to warn a user using a simple method.

The mobile communication terminal according to the third aspect of the present invention comprises: a storage section that stores a plurality of applications; a receiving section that receives message that contains a startup instruction for a specific application and information on that application; a storage section that, for each of the stored applications, stores the application information and also stores information that shows whether or not the application is able to be started up by the startup instruction; and a control section that, when the receiving section receives the message instructing that the application be started up, determines whether or not startup of the application is possible by collating the application information contained in the message with the information that shows whether or not the application in the storage section is able to be started up, and controls a startup of the application based on a result of the determination.

The program according to the third aspect of the present invention executes on a computer: a reception process that receives message that contains a startup instruction for a specific application and information on that application; a determination process that, when the message instructing that the application be started up is received by the reception process, determines whether or not startup of the application is possible by collating the application information contained in the message with information that shows whether or not the application stored in a storage section is able to be started up by the startup instruction; and a control process that controls a startup of the application based on a result of the determination of the determination process.

According to the third aspect of the present invention, it is possible to ensure that a particular application is not started up even if a notification such as an SMS message for starting up an application is received in a state such as manner mode in which the user has restricted use of the mobile communication terminal.

The mobile communication terminal according to a fourth aspect of the present invention comprises: a storage section that stores an access charge that is charged when an application accesses a network; and an accumulated communication charge; a receiving section that receives a message instructing that a specific application be started up; and a determining section that determines whether or not an accumulated communication charge will exceed an upper limit for the accumulated communication charge based on identification information of an application that is contained in the received message, on the accumulated communication charge in the storage section, and the access charge in the storage section.

The program according to the fourth aspect of the present invention executes on a computer: a reception process that receives a message instructing that a specific application be started up; and a determination process that determines whether or not an accumulated communication charge will exceed an upper limit for the accumulated communication charge based on identification information of an application that is contained in the received message, on the accumulated communication charge that is stored, and on information about a charge that is charged when the application accesses a network.

According to the fourth aspect of the present invention, it is possible to prevent an accumulated communication charge reaching a high cost without the user being aware of it. In addition, by notifying a user when an application has not started up based on the accumulated communication charge, the user can be made aware that the accumulated communication charge has reached an upper limit.

The mobile communication terminal according to a fifth aspect of the present invention comprises: a storing section that stores a received message instructing that a specific application be started up; a list creating section that, when a plurality of unprocessed messages are stored in the storing section, creates a list of applications corresponding to the respective messages; a display section that displays the created list; and an application startup section that starts up an application that is selected from among the applications being displayed in the list.

The program according to the fifth aspect of the present invention executes on the computer: a storing process that stores a received message instructing that a specific application be started up; a list creating process that, when a plurality of unprocessed messages are stored, creates a list of applications corresponding to the respective messages; a display process that displays the created list; and an application startup process that starts up an application that is selected from among the applications being displayed in the list.

According to the fifth aspect of the present invention, if a plurality of startup messages are received substantially simultaneously, and a plurality of unprocessed startup messages are present, a list of applications that correspond to the unprocessed startup messages are created and displayed, so that it is possible to enable a user to select an application to be started up. As a result, the user is able to begin processing from the message to which the user allocates the highest priority, thereby enabling an extremely convenient service to be provided.

The mobile communication terminal according to a sixth aspect of the present invention comprises: a display section that displays a notification of the arrival of an incoming signal or a notification that is generated as a result of the arrival of an incoming signal; a control section that measures an elapsed time since the release of a key by a user, and, when the arrival of the incoming signal has occurred, controls a display of the notification on the display section based on the elapsed time measured.

The program according to the sixth aspect of the present invention executes on a computer: a display process that displays a notification of the arrival of an incoming signal or a notification that is generated as a result of the arrival of an incoming signal; a key monitoring process that measures an elapsed time since the release of a key by a user; and a control process that, when the arrival of the incoming signal has occurred, controls the display process of the notification based on the elapsed time measured by the key monitoring process.

According to the sixth aspect of the present invention, it is possible to reduce the feelings of annoyance and surprise that arise when a notification relating to the arrival of an incoming signal is suddenly displayed when a user is playing a game or running an application while waiting for an incoming signal to arrive, and to prevent consequent operational errors from occurring. In addition, it is possible to obtain the effects of the present invention in every facet of the operation of the mobile communication terminal, without it being necessary to restrict the operations of the mobile communication terminal to specific modes and to the running of specific applications.

Accordingly, it is possible to provide a mobile communication terminal that is easy for a user to understand and use.

The mobile communication terminal according to a seventh aspect of the present invention comprises: a display section that displays a notification of the arrival of an incoming signal or a notification that is generated as a result of the arrival of an incoming signal; and a control section that monitors whether or not unset characters are being displayed on the display section during a character input operation, and, when displaying the notification on the display section, determines whether or not the unset characters are being displayed on the display section, and controls the display of the notification based on a result of the determination.

The program according to the seventh aspect of the present invention executes on a computer: a notification display process that displays a notification of the arrival of an incoming signal or a notification that is generated as the result of the arrival of an incoming signal; a monitoring process that monitors whether or not unset characters are being displayed during a character input operation; and a control process that, when displaying the notification, determines whether or not the unset characters are being displayed on a display section, and controls the display of the notification based on a result of the determination.

According to the seventh aspect of the present invention, if unset characters are being displayed on the screen during a character input operation, notification of the arrival of an incoming signal is not displayed. Therefore, the effect is obtained that there is no interruption by notifications of the arrival of an incoming message until a user performs a setting operation. As a result, after a telephone conversation has ended, and the screen has returned to the original character input screen, it is possible to start again from the next character input, and the work that has been performed up until partway through an input operation does not become wasted. Furthermore, it is possible to provide a mobile communication terminal that is comfortable to use without causing any feeling of annoyance that may arise if the concentration of the user is interrupted.

The computer readable recording medium of the present invention has the programs according to each of the above-described aspects recorded thereon.

BRIEF DESCRIPTION THE DRAWINGS

FIG. 2 is a structural view showing an example of the contents recorded in a local stock price database.

FIG. 3 is a structural view showing an example of the contents recorded in a user database.

FIG. 4 is a structural view showing an example of price update information for a user.

FIG. 5 is a structural view showing an example of application startup mail.

FIG. 6 is a structural view showing an example of an SMS received by a user terminal.

FIG. 10 is a structural view showing an example of an application type list.

FIG. 11 is a structural view showing an update notification screen

FIG. 12 is a block diagram showing the structure of a mobile communication terminal according to the first embodiment of the present invention.

FIG. 20 is a structural view showing an example of the structure of a database.

FIGS. 22A and 22B are structural views showing examples of display screens according to the third embodiment of the present invention when an SMS notification is made in manner mode.

FIG. 25 is a structural view showing an example of application information.

FIG. 26 is a structural view showing a notification condition matrix.

FIG. 27 is a structural view showing an example of extended application information.

FIG. 32 is a block diagram showing the structure of a mobile telephone according to the sixth embodiment of the present invention.

FIGS. 42A and 42B are structural views showing examples of conventional display screens when an SMS notification is made in manner mode.

DETAILED DESCRIPTION OF THE INVENTION (First Embodiment)

In the present embodiment, a term of validity is set when an application startup instruction is given from a server to a mobile communication terminal, and the mobile communication terminal does not obey startup instructions whose term of validity has expired.

Figure 1:
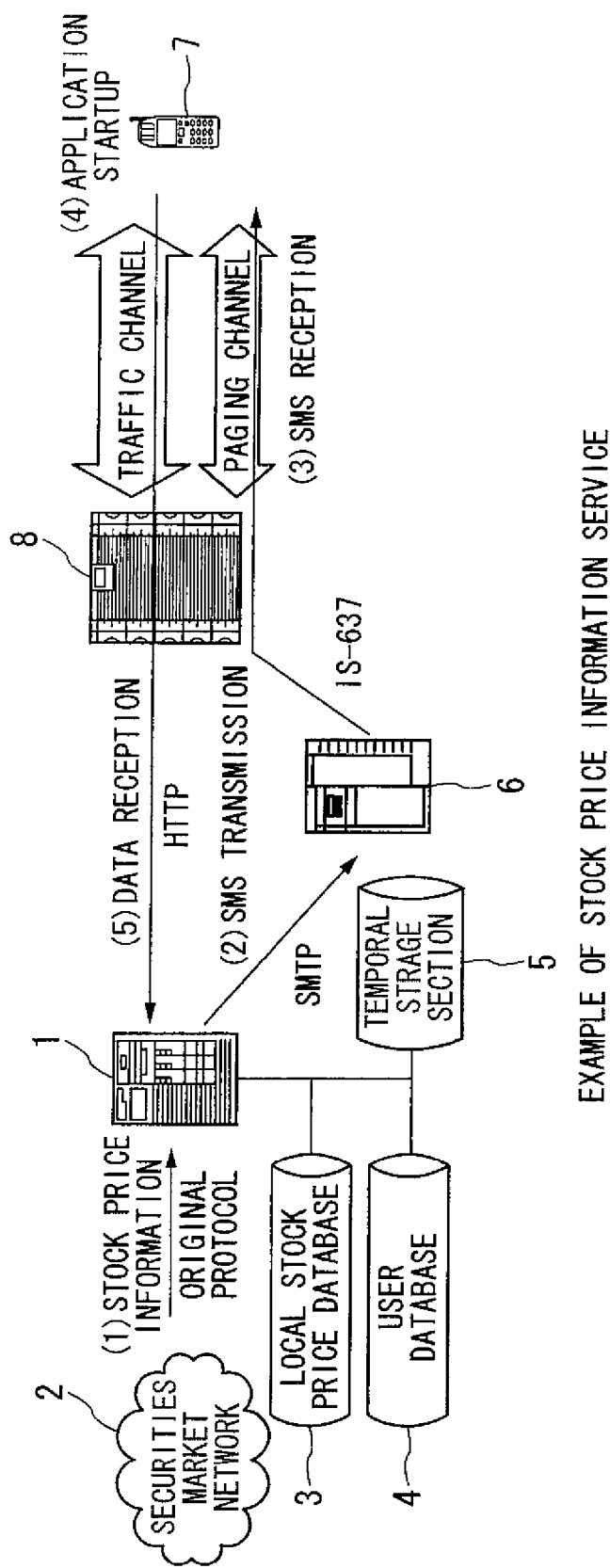
FIG. 1 is a structural view of an application startup information providing system according to the first embodiment of the present invention.

FIG. 1 is a structural view of an information providing system that is based on an application startup according to the first embodiment of the present invention. The present embodiment shows a case in which the present invention is applied to a service system in which a server provides stock price information to a user.

The system shown in FIG. 1 is formed by a stock price information server 1, an SMS server 6 that transmits an SMS message from the stock price information server 1 to a user, a user terminal 7 serving as a mobile communication terminal belonging to the user, and a mobile exchange system 8 that relays communication between the stock price information server 1, the SMS server 6, and the user terminal 7. The mobile exchange system 8 and the user terminal 7 are connected by two transmission paths, namely, a traffic channel that is used for data communication and a paging channel that is used for SMS (i.e., PUSH messages) communication.

The stock price information server 1 is connected to a securities market network 2 formed by a securities exchange and securities companies. The stock price information server 1 has a local stock price database (DB) 3 and a user DB 4. Information on stock prices being traded is recorded in the local stock price DB 3, and the stock price information is updated in real time. The names of stock held by a user who is receiving a stock price information providing service, the number of the stocks held, purchase prices of stocks monitored by the user and the like are recorded in advance in the user DB 4. FIG. 2 shows an example of contents recorded in the local stock price DB 3, and FIG. 3 shows an example of contents recorded in the user DB 4.

When the stock price information server 1 receives updated information on stock prices from the securities market network 2, a determination is made as to whether or not the updated stocks are stocks recorded in the user DB 4. If they are stocks that are recorded in the user DB 4, update startup processing is performed. In this update startup processing, firstly, stock price update information for the user, such as that shown in FIG. 4, is created from information stored in the local stock price DB 3 and the user DB 4, and a space is acquired in a temporal storage section 5 and this information is stored therein.

Next, the stock price information server 1 sends the application startup mail shown in FIG. 5 in order to update the data to the SMS address of the user that is stored in the user DB 4. In the content of this startup mail are recorded two byte binary code showing that this mail is a special message (i.e., is a message instructing the startup of an application), code identifying the application to be run, application startup parameters, and the date and time of the term of validity of this mail.

When the user terminal 7 is in a state in which it is able to receive an SMS message, an SMS message such as that shown in FIG. 6 is received over the paging channel via the SMS server 6 and the mobile exchange system 8.

Figures 7, 8:
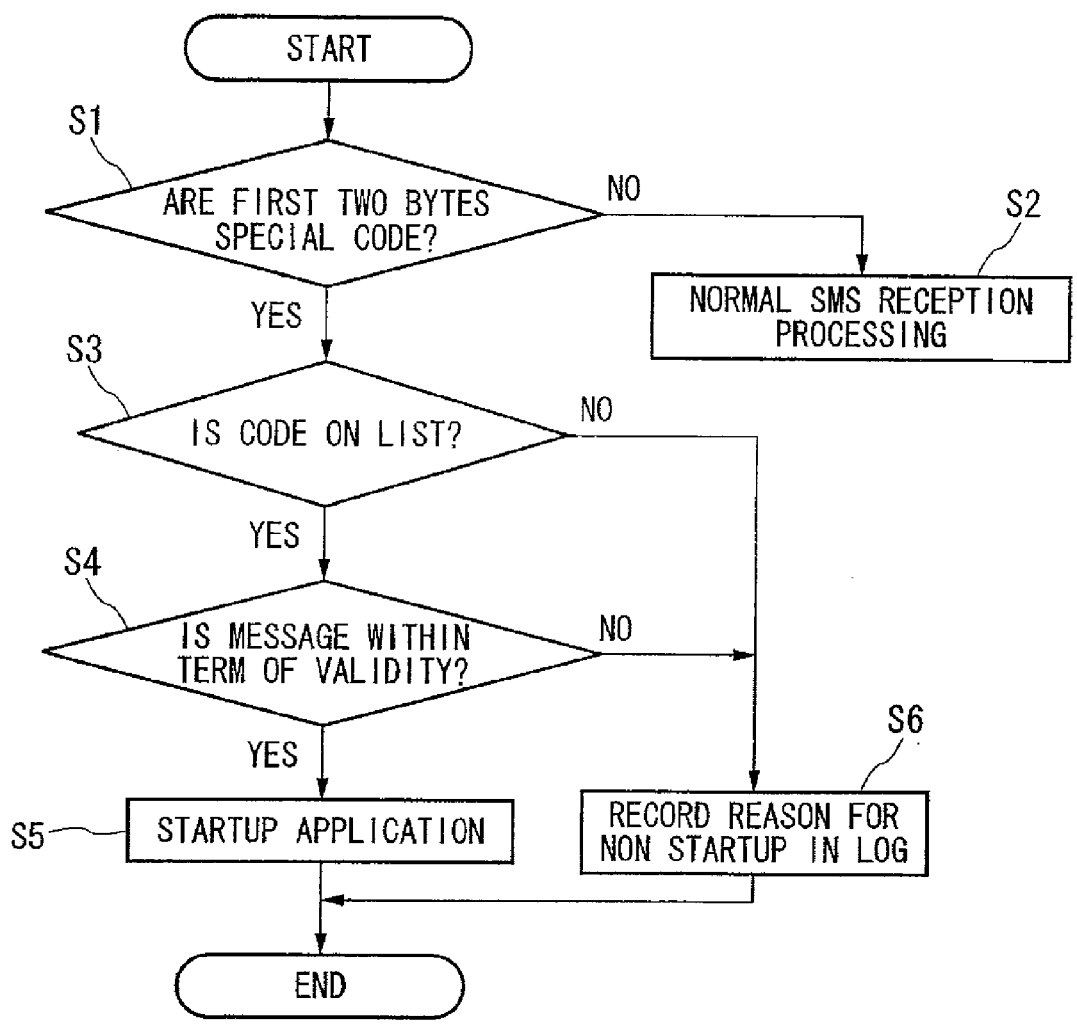
FIG. 7 is a flowchart showing SMS message reception processing.
FIG. 8 is a structural view showing an example of an application list.

The flow of processing when the user terminal 7 receives an SMS message is shown in FIG. 7.

When the user terminal 7 receives the aforementioned SMS message, firstly, the first two bytes of the text of the SMS message are recognized, and a determination is made as to whether they are a binary code showing the message is a special message (step S1—the word step is omitted hereinafter). If the message is not a special message, normal SMS message reception processing is performed (S2). If the binary code does show that the message is a special message, the application code to be started up is read, and a determination is made as to whether or not the application code is registered on the application list shown in FIG. 8 that is registered at the time the application is installed (S3). If the application code to be started up is not registered on the application list, the application is not started up and the reason why it is not started up is recorded in the log (S6). Next, a determination is made as to whether or not a term of validity is attached to the startup message, and whether or not the startup message is received within this term of validity (S4). If the startup message is received within this term of validity, an application that is registered on the application list is started up (S5). If the startup message is not received within the term of validity, the application is not started up and the reason why it is not started up is recorded in the log (S6).

Figure 9:
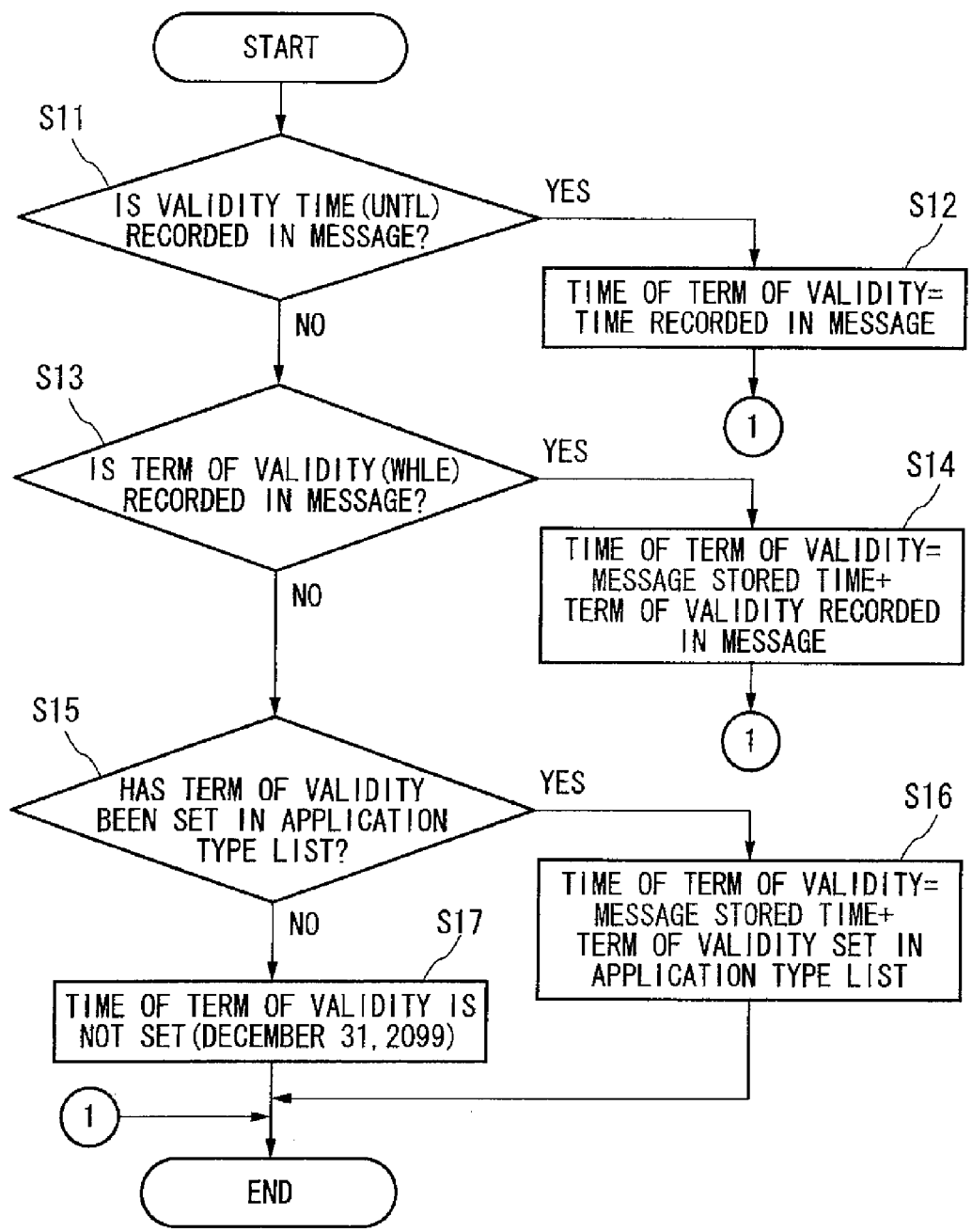
FIG. 9 is a flowchart showing calculation processing of a startup effective time.

The determination of S4 as to whether or not the startup message is received within the term of validity is performed using the procedure shown in FIG. 9.

Firstly, it is checked whether or not the time of the term of validity is recorded in the message as an absolute time (for example, Sep. 11, 2003, 9:48 AM 0 seconds) (S11). The absolute time is recorded together with a UNTL header (see FIG. 5). Thus, a determination is made as to whether or not a UNTL header is recorded in the message, and if it is recorded the absolute time thereof is taken as the time of the term of validity (S12). If a UNTL header is not recorded, whether or not an effective period is recorded in the message is checked (S13). The effective period is recorded together with a WHLE header (not shown). If a WHLE header is recorded in the message, a value obtained by adding this effective period to the stored time of the messages to the stock price information server 1 that is recorded in the header of the SMS messages is calculated as the time of the term of validity (S14). Generally, the transfer of mail from an information providing server (here, the stock price information server 1) to the SMS server 6 is performed immediately, and the message stored time and the time when the information providing server transmits the messages may be considered as substantially the same time.

If neither a UNTL header nor a WHLE header are recorded, then the application type list shown in FIG. 10 is checked (S15). In the application type list, an effective period is recorded for each type of application. Types of application include, for example, stock price services, weather forecast services, news services, alarm services, games and the like. If the effective period is recorded, a value obtained by adding this effective period to the stored time of the messages to the server that is recorded in the header of the SMS messages is calculated as the time of the term of validity (S16). If the effective period is not recorded, then either termless, or an impractical term of validity such as, for example, Dec. 31, 2099 is set (S17).

The user terminal 7 starts up the application strenew with the parameters attached to the mail. The application strenew acquires updated information from the stock price information server 1 using an HTTP protocol. If necessary, the user terminal 7 can be constructed so as to connect automatically to the Internet. If an access for an update is made from the application strenew, the stock price information server 1 searches the temporal storage section 5 and transmits all update information whose user codes match over the traffic channel via the mobile exchange system 8. When the data transmission has ended, the update information is deleted from the temporal storage section 5. When the user terminal 7 acquires the update information, it displays the fact that the stock price has changed and notifies the user using the update notification screen shown in FIG. 11. Meanwhile, the stock price information server 1 deletes the price update information for the user whose downloading has ended, and releases the storage space that had been acquired for that price update information. At the time that trading for that day is ended, update information summarizing that day is created and an update is made using the similar method.

The above is a description of when the present invention is applied to an information providing server system that provides stock price information to user, and is a description of an example in which the stock price information server 1 is used as an e-mail server (i.e., an information providing server). However, the present invention can also be applied to systems that provide other types of information. For example, the present invention can also be applied to a variety of information providing service systems described in FIG. 10 such as the stock price service, a weather forecast service, a news service, an alarm service, and games. A weather forecast server, a news server, an alarm server, a game server and the like are used respectively as the server in each of these cases.

FIG. 12 is a block diagram showing the structure of a mobile communication terminal serving as the user terminal 7 according to the first embodiment of the present invention.

In FIG. 12, a CPU 10 controls the overall operation and also determines whether or not a term of validity is attached to an SMS message from a server such as the stock price information server 1. It also determines the term of validity of the message and controls the startup of an application based on an instruction that is contained in an SMS message. A communication section 11 conducts SMS message and e-mail communication with a server, and has a communication function of a mobile communication terminal such as a normal mobile phone. An application storage section 12 stores a plurality of types of application that correspond to a plurality of services such as those shown in FIG. 10. In addition, application lists and effective periods for each application and the like are recorded in the application storage section 12. A keys and display section 13 is provided with operation keys, and also displays information such as stock price information that is supplied from a server. ROM 14 stores programs and the like of the CPU 10. RAM 15 is used for working tasks.

(Second Embodiment)

In the present embodiment, a case is described in which there is a failure in the startup of an application attempted in response to the receipt of an SMS message, and in which a startup failure message indicating that fact is created and displayed.

Figure 13:
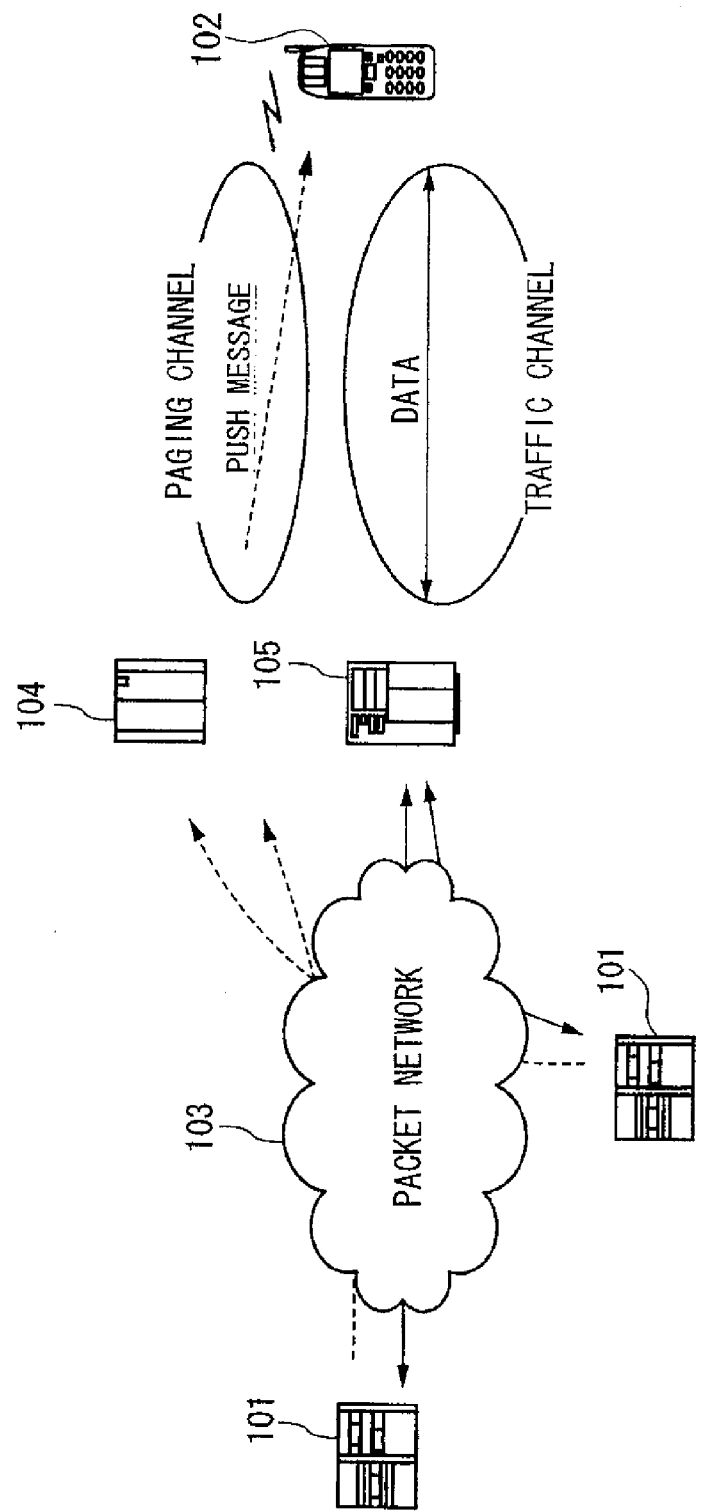
FIG. 13 is a structural view of a system relating to the second embodiment of the present invention.

FIG. 13 shows the structure of the system relating to the second embodiment of the present invention.

In FIG. 13, information delivered by a contents server 101 toward a mobile telephone 102 is received by an SMS server 104 via a packet network 103. If the mobile telephone 102 is a CDMA type of telephone, the SMS server 104 transmits a PUSH message over the paging channel and the transmitted PUSH message is received by the mobile telephone 102. In this case, even if the mobile telephone 102 is conducting data communication or make a telephone call over the traffic channel in parallel with the transmission of the PUSH message, the message reception processing can be performed. When the mobile telephone 102 receives the PUSH message, it starts up an application that corresponds to this PUSH message, and for data communication over the traffic channel, commences communication with the contents server 101 via a packet serving data node (PSDN) 105. Note that, in the present embodiment, SMS is used for the transmission and reception of messages; however, it is also possible to use e-mail instead of SMS.

Figure 14:
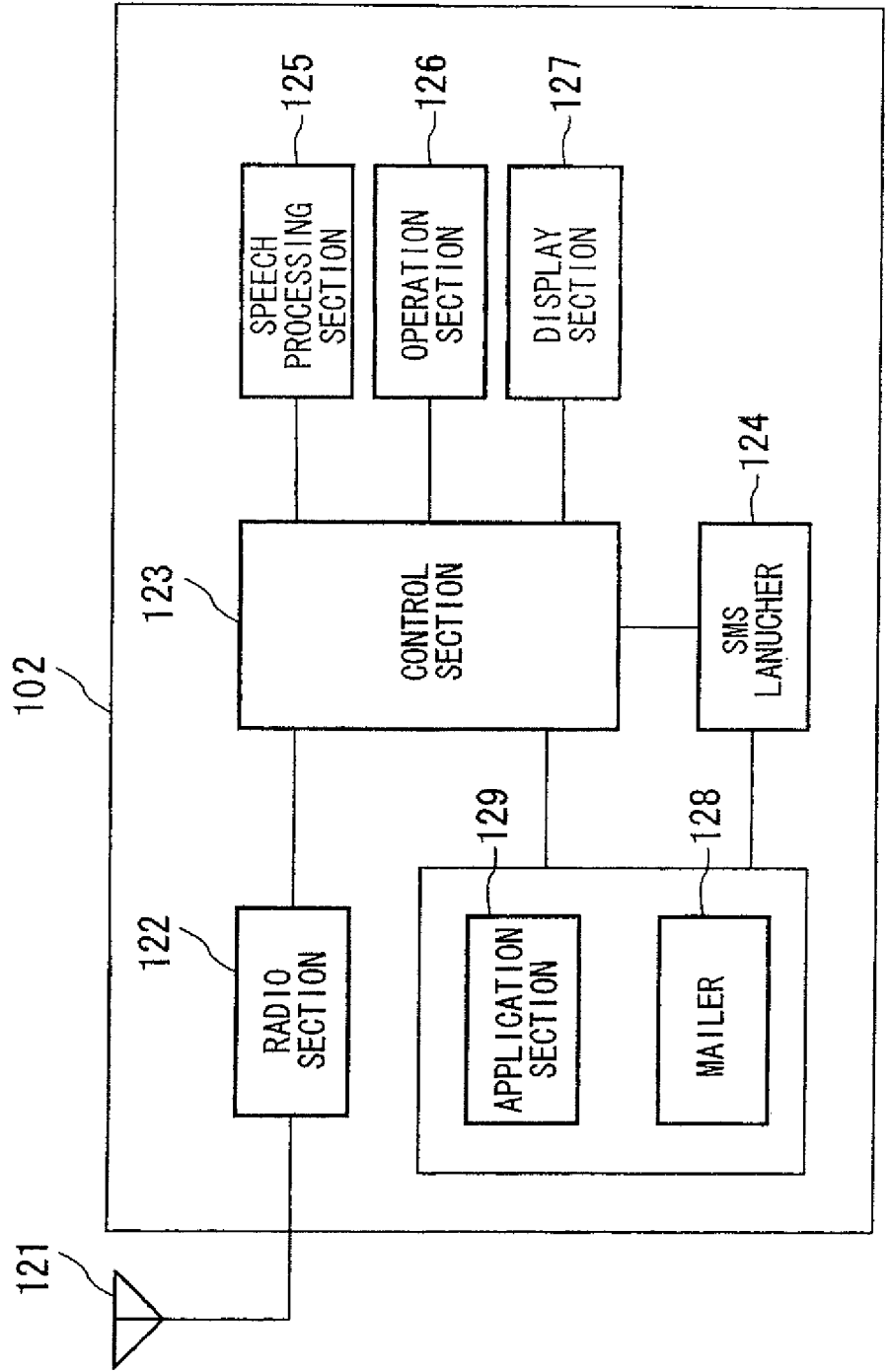
FIG. 14 is a block diagram showing the structure of a mobile telephone serving as a mobile communication terminal according to the second embodiment of the present invention.

FIG. 14 shows the structure of the mobile telephone 102 serving as a mobile communication terminal according to the second embodiment of the present invention.

When a control section 123 receives a PUSH message via an antenna 121 and a radio section 122, it starts up an SMS launcher 124. The control section 123 carries out the integrated control of a speech processing section 125, an operation section 126, a display section 127, the SMS launcher 124, a mailer 128, and an application section 129. A plurality of applications are stored in the application section 129.

The SMS launcher 124 is provided with a unit that analyzes application information contained in the PUSH message, a unit that starts up an application based on the results of the analysis, a creating unit that, when it has not been possible to start up an application, creates an error message and then creates an SMS message (hereinafter, referred to as a startup failure SMS message) that includes the information of the PUSH message and the error message, and a transmitting unit that sends the startup failure SMS message to the mailer 128. The mailer 128 receives and saves PUSH messages and e-mail, and also displays information on the display section 127 based on an operation by the user of the operation section 126.

Figure 15:
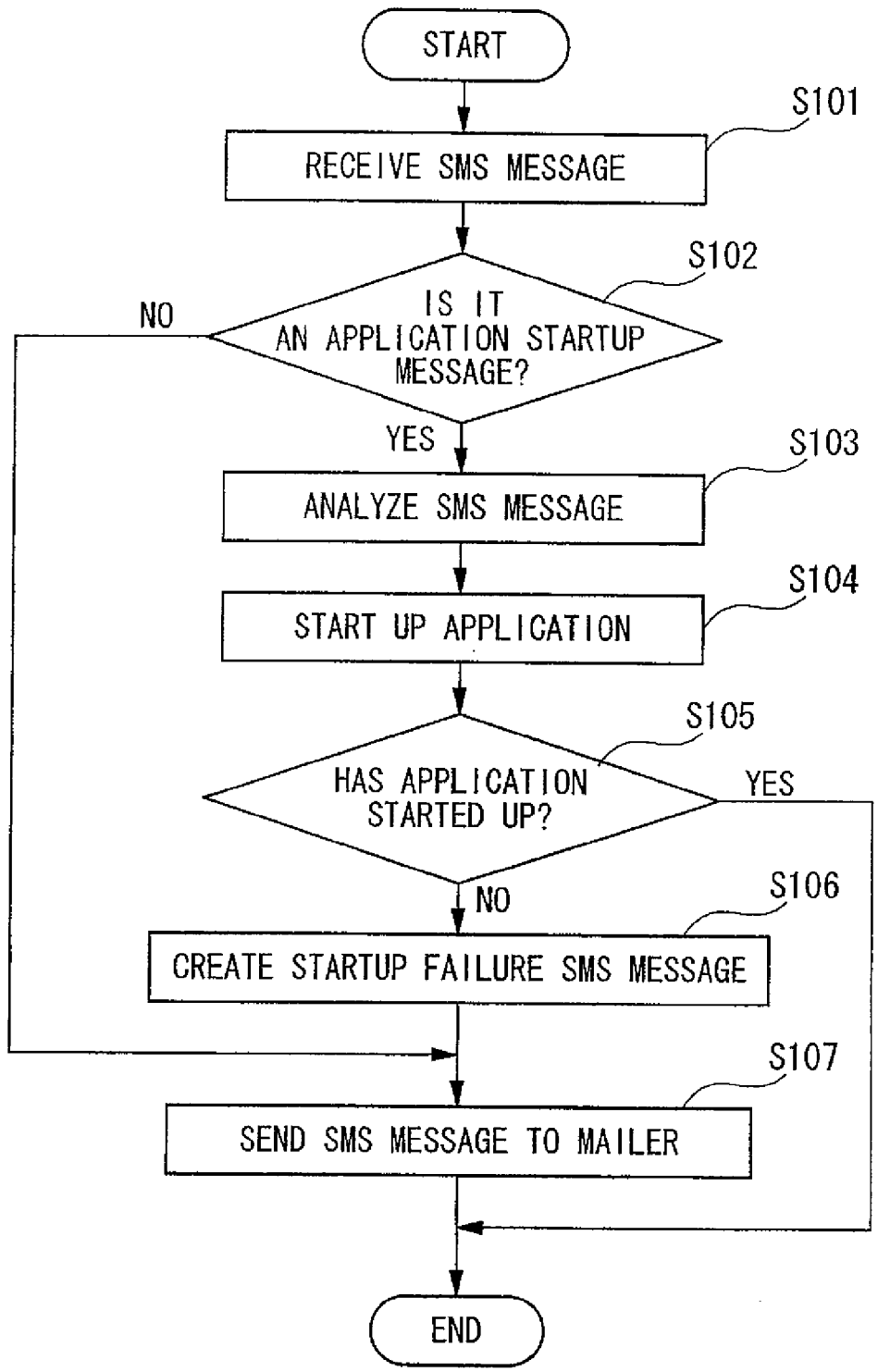
FIG. 15 is a flowchart showing the operation of an SMS launcher.

FIG. 15 shows the operating sequence of the SMS launcher 124.

When a mobile telephone 102 receives an SMS message (S101), the SMS message is sent to the SMS launcher 124. The SMS launcher 124 determines whether or not the SMS message is an application startup message (S102). If the SMS message is not an application startup message, then because the SMS message is only a short message, it is sent to the mailer 128 as it is (S107).

If the SMS message is an application startup message, the SMS message is analyzed (S103). An application name or PUSH message service name, contact details of the service provider (including telephone number and e-mail address) or a setting URL address for the service (in the present embodiment, the service cancellation setting URL is used), and parameters that are required when the application is started up are extracted from an application startup message.

The corresponding application in the application section 129 is then started up based on the results of the analysis of the application startup message (S104). If the application cannot be started up (i.e., if the result of the determination in step S105 is NO), the application name or PUSH message service name included in the PUSH message, the service cancellation setting URL address, an error message containing the reason why the application could not be started up, and the time the PUSH message was received are created as a text data startup failure SMS message (this is not limited to an SMS message and may take the form of message data such as e-mail) (S106). This message is then sent to the mailer 128 (S107). Reasons why the application could not be started up may include the fact that the application has not been installed on the mobile telephone, the term of validity of the application has expired, or that the time is outside the term of validity of the SMS message that is contained in the SMS message.

Figure 16:
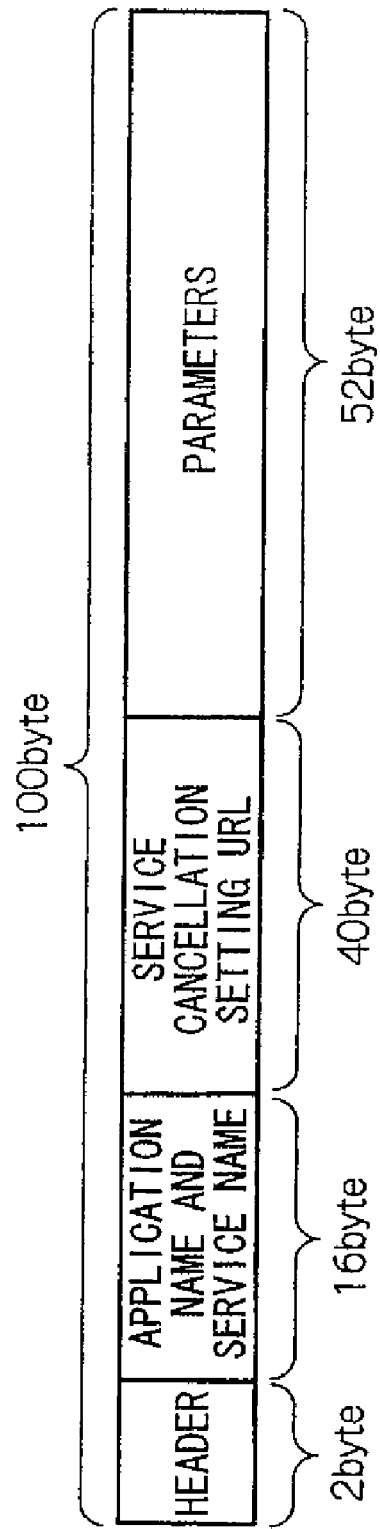
FIG. 16 is a structural view showing an example of the data structure of an SMS message.

FIG. 16 shows an example of the data structure of an SMS message.

A normal SMS message is a short text message, however, an SMS message for starting up an application is binary data. An SMS message for starting up an application includes mainly information on the service provider and information on the application provider. For example, the name of the service, the name of the service provider, the name of the application provider, the name of the application, the telephone number of the service provider, the URL of the service provider, the e-mail address of the service provider, the telephone number of the application provider, the URL of the application provider, and the e-mail address of the application provider.

In the example of the data structure shown in FIG. 16 are included a header that is used for determining whether or not the SMS message is an SMS message for starting up an application or is normal text SMS message data, the name of the service of the PUSH message or the name of the application, a service cancellation setting URL address, and parameters that are required when starting up an application. Note that instead of the service cancellation setting URL address, a service continuance setting URL or a service subscription setting URL may also be used, or else all of these may be included.

Figure 17:
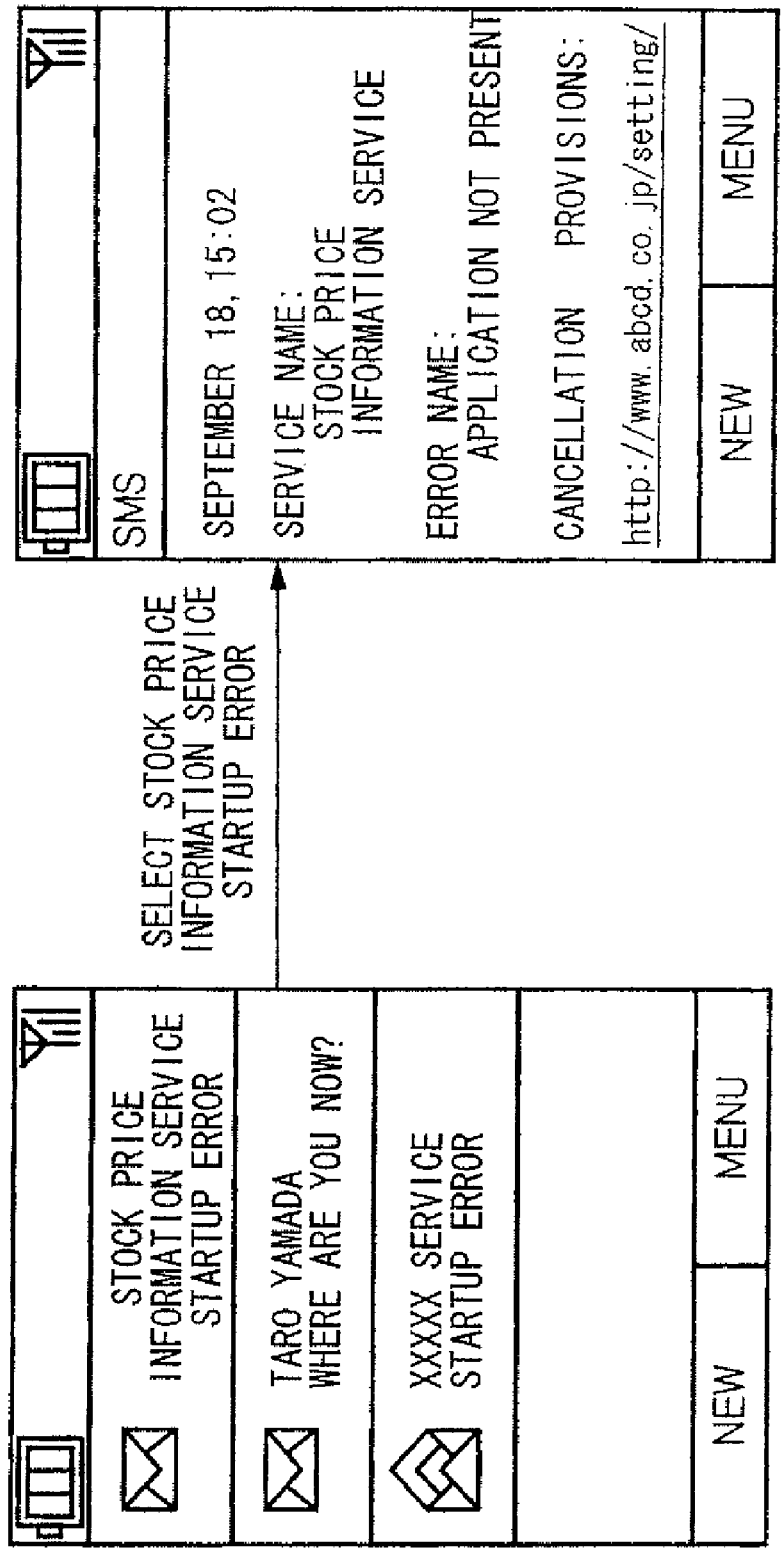
FIG. 17 is a structural view showing an example of an SMS message display.

FIG. 17 shows an example of a startup failure SMS message and is an example of when no application that corresponds to a stock price information service is present.

The mailer 128 is stared up when the user so wishes or when an SMS message is received. If the mailer 128 receives a startup failure SMS message, it stores the message and displays it as an unread SMS message or e-mail. Because the sender and a title are included in a startup failure SMS message, it is possible to ascertain immediately the contents of a startup failure SMS message if these are displayed as a list as is shown in the left side of FIG. 17. If the user selects a startup failure SMS message, then, as is shown in the right side of FIG. 17, the date, the name of the application or service whose startup failed, error message, and the URL where service cancellation settings can be made are displayed.

If a user desires to terminate a stock price information service, then simply by selecting the URL of the cancellation setting shown in FIG. 17, a browser is started up, and once the predetermined settings are made the service can be cancelled. In addition, although omitted from the drawing, if a telephone number is included in the SMS message instead of a service cancellation setting, then if this telephone number is selected it is possible to make a telephone call to the service provider.

Furthermore, because the data of a startup failure SMS message is held as an SMS message for as long as the user does not delete the startup failure SMS message, then if the user views the startup failure SMS message and accesses the service provider, the user can cancel the service of the application startup error at any time.

According to the present embodiment, the following effects can be obtained.

(a) If an SMS message is received and there is a failure in the startup of an application, by converting the information thereof into message data and storing it as message data and displaying it upon a screen, a warning can be given to the user.

(b) If an SMS message is received and there is a failure in the startup of an application, if the service provider information is converted into a text message and displayed, and if this message is then selected, then by performing an operation that is related thereto (such as selecting the URL to start up the browser), the user is able to easily terminate the service, continue the service, or subscribe to the service.

(c) Even if a large number of SMS messages are received simultaneously and there is a failure in the startup of an application, because the SMS messages are stored as message data, the user is able to view the reason for the failure as message data at any time the user wishes, without needing to perform any complicated operation such as closing a pop-up window one at a time, as is the case with displaying startup failure SMS messages on pop-up windows.

(d) By including sender information and a title in the message data, the user is able to immediately ascertain the contents of the SMS message when the user views the SMS list.

Note that, in addition to storing a startup failure message and notifying a user as to the contents thereof by displaying it as text or a pop-up on the display section, notification can also be made in the same way as when a normal message is received by displaying it as a newly arrived message, by the turning on or flashing on and off of an LED or the like, by vibration using a vibrator or the like, or by a sound output using a speaker or the like.

(Third Embodiment)

In the present embodiment, by determining whether or not the startup of an application is possible based on application information contained in an SMS notification (i.e., message) and on the state of a mobile communication terminal, no attempt is made to start up an application whose startup is restricted due to the state of the mobile communication terminal.

Figure 18:
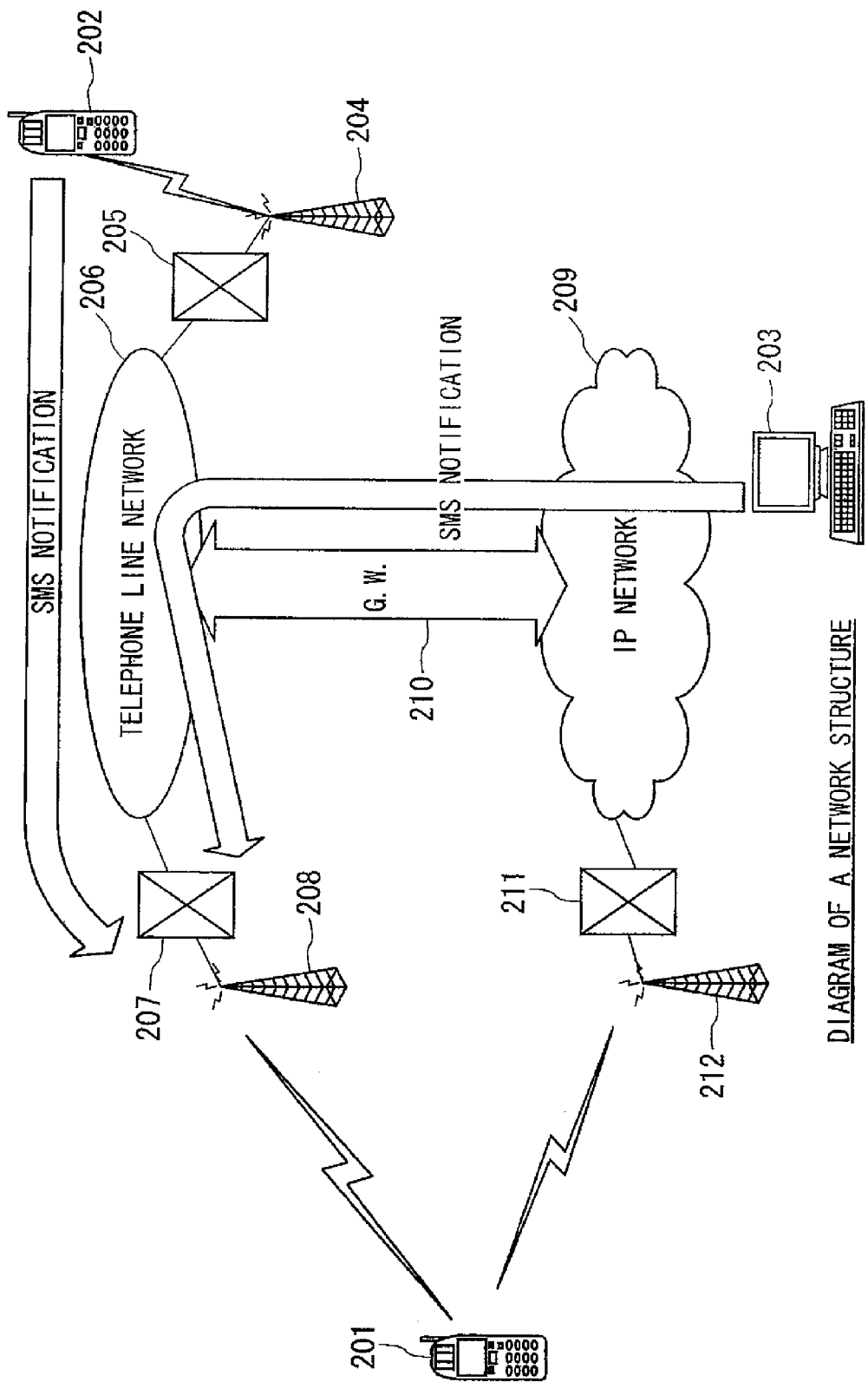
FIG. 18 is a structural view showing an application automatic startup system according to the third embodiment of the present invention.

FIG. 18 is a structural view of the application automatic startup system according to the third embodiment of the present invention.

FIG. 18 shows a network structure when a PUSH type SMS notification for an application startup is made to a mobile terminal 201 such as a hybrid mobile terminal formed by combining a cdma2000 1x with a 1xEVDO (evolution data only) from another mobile terminal 202 or PC 203.

When a notification is made from the mobile terminal 202, it is transferred via the cdma2000 1x base station 204, an exchange station 205, a telephone line network 206 such as the Internet, an exchange station 207, and the cdma2000 1x base station 208. When a notification is made from the PC 203, it is transferred via an Internet network (IP network) 209, a gateway (G.W.) 210, the exchange station 207, and the cdma2000 1x base station 208. High speed packet communication between the mobile terminal 201 and the PC 203 is conducted via the IP network 209, an exchange station 211, and a 1xEVDO base station 212.

Figure 19:
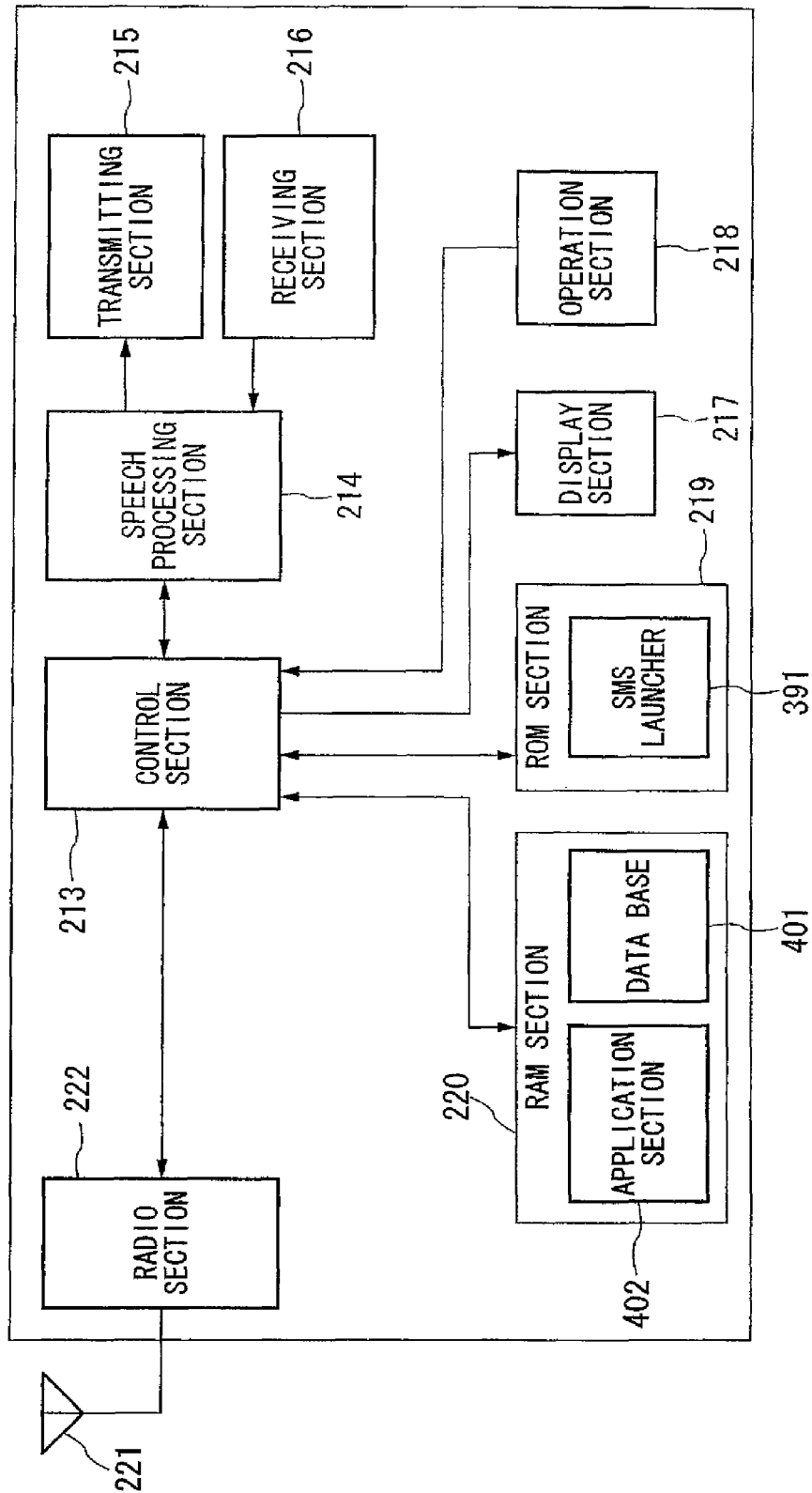
FIG. 19 is a block diagram showing the structure of a mobile communication terminal according to the third embodiment of the present invention.

FIG. 19 is a block diagram showing the structure of a mobile communication terminal according to the third embodiment of the present invention.

In FIG. 19, an SMS launcher 391 stored in a ROM section 219 is provided with a determining unit that analyses application information contained in an SMS notification from the mobile terminal 202 or the PC 203, and when in manner mode determines whether or not application startup is possible.

A plurality of applications are stored in an application section 402 in a RAM section 220. Application information and information that shows whether or not automatic startup is possible, which are necessary for the above-described determination, are stored for each application in a database (DB) 401 in the RAM section 220.

In addition to these, the mobile communication terminal is provided with a speech processing section 214, a transmitting section 215, a receiving section 216, a display section 217, an operation section 218, an antenna 221, a radio section 222, and the like in order to conduct normal mobile telephone functions. Moreover, programs for a CPU in a control section 213 are stored in the ROM section 219.

FIG. 20 shows an example of the structure of a database 401 that is required for the determining unit in the SMS launcher 391 to analyze application information and conduct the above determination.

In FIG. 20, the row A shows the application numbers of applications installed in the mobile terminal 201, while the row B shows the application names thereof. The row C shows the ON/OFF classification of the automatic startup setting for normal operation, while the row D shows the ON/OFF classification of the automatic startup setting for manner mode. This ON/OFF refers to whether or not the application will start up automatically or not start up automatically. These data items are stored for each application (here, 00 to 10).

For example, the player application that is recorded for the application number 01 is started up during normal operation as the automatic startup setting is ON, however, in manner mode it is not started up as the automatic startup setting is OFF. This is effective for applications to which the user wishes to apply automatic startup restrictions in manner mode. The GPS application that is recorded for the application number 10 is started up in normal mode as the automatic startup setting is ON. In addition, it is also started up in manner mode as the automatic startup setting is ON. This is effective for applications to which the user does not wish to apply automatic startup restrictions in manner mode.

Figure 21:
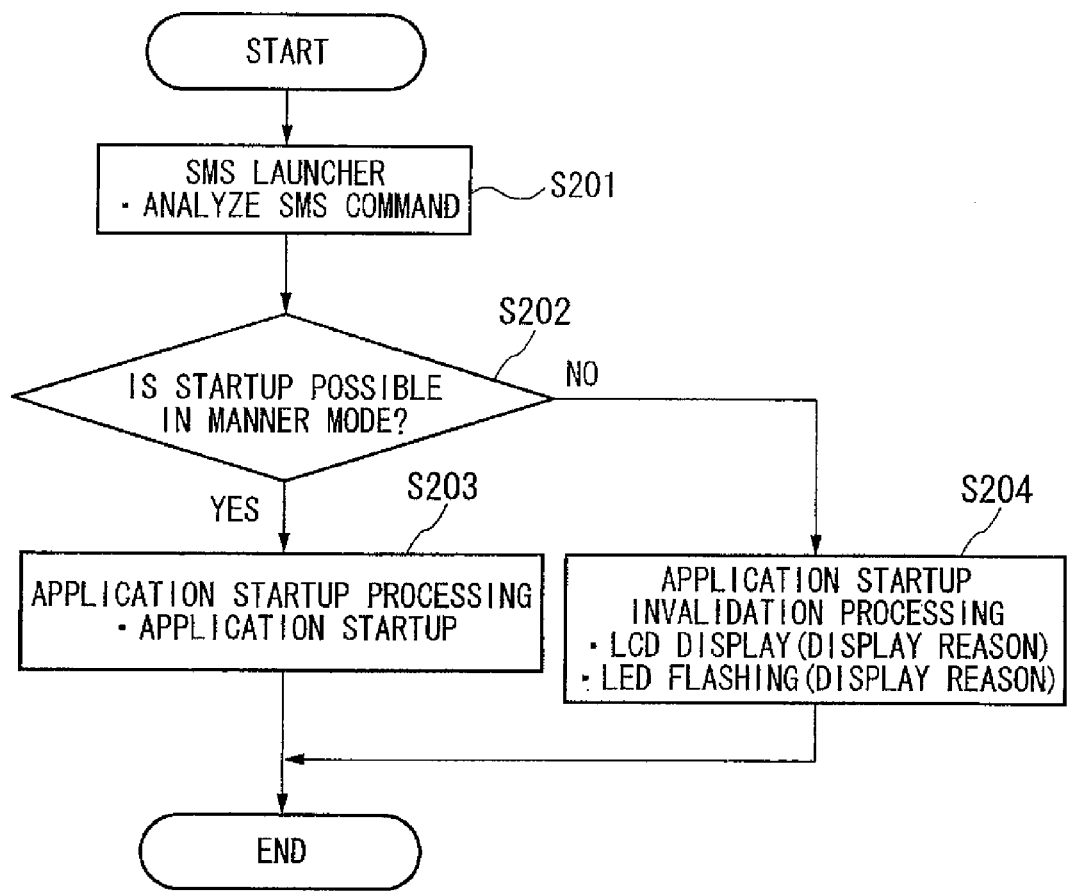
FIG. 21 is a flowchart showing an operation of a mobile communication terminal according to the third embodiment of the present invention.

Next, an operation based on the above-described structure will be described with reference made to the flowchart shown in FIG. 21.

When the control section 213 receives an SMS notification via the antenna 221 and the radio section 222, it starts up the SMS launcher 391 and analyzes application information contained in the SMS notification (S201). Namely, it collates application information contained in the SMS notification with the respective information in the database 401, and for application information that matches information in the database 401, determines the ON/OFF setting for that application in manner mode based on the row D in FIG. 20 (S202). In addition, the control section 213 determines whether the mobile communication terminal is currently in manner mode, and performs startup processing (S203) if automatic startup is ON in manner mode. If automatic startup is OFF in manner mode, startup invalidation processing is performed and this is displayed on the display section 217 (S204).

FIG. 22A and FIG. 22B show examples of display screens according to the present embodiment when SMS notification is given in manner mode.

When an SMS notification arrives during the wait display shown in FIG. 22A, and the mobile communication terminal has been placed in manner mode, then when an application could not be started up in accordance with the determination result, an application automatic startup result based on an SMS notification that contains a timestamp and a reason is shown by a pop-up window or by full-screen display, as is shown in FIG. 22B, so that the user is made aware of this fact. At the same time, the user may also be made aware of this fact by the flashing pattern of the incoming signal arrival lamp.

If the determination result shows that startup is not possible, then another determination may be made after a predetermined time and startup may be possible if the manner mode has now been cancelled, or startup may be made possible if the manner mode is cancelled within a predetermined period.

In the present embodiment, a description is given of a determination as to whether or not startup of an application is possible in manner mode. However, the description may also apply to the determination as to whether or not startup of an application is possible in modes in which some function or other of the mobile communication terminal is restricted other than manner mode such as, for example, modes (i.e., states) in which sounds or light is given off such that people nearby are not disturbed, that is, drive mode, energy conserving modes (i.e., modes in which energy consumption is reduced such as by dimming the display), and silent modes (i.e., modes in which neither ring tones or vibrations are operated). Moreover, the automatic startup setting in the aforementioned modes may be a setting of ON or OFF only. If the automatic startup setting is OFF only, then if no setting is made, automatic startup is made in this mode. If the automatic startup setting in ON only, then when no setting is made, automatic startup is not performed in this mode.

(Fourth Embodiment)

In the present embodiment, each time a PUSH message is received, the application to be started up and the cost thereof are checked, and a check is made as to whether or not the sum of the accumulated communication charge amount added to the charge amount generated by starting up the application and accessing the network will be in excess of an upper limit set for the accumulated communication charge amount. The application is started up only if it will not be excess of the upper limit.

A structural diagram of the SMS system of the fourth embodiment according to the present invention is the same that in FIG. 13 referred to in the second embodiment, and the overall operation thereof is also the same as in the second embodiment.

Namely, in FIG. 13, the contents server 101 sends information for starting up an application of the mobile terminal 102 via the packet network 103. The SMS server 104 receives this information and the SMS server 104 sends this information as a PUSH message to the mobile terminal 102 over a normal paging channel. The mobile terminal 102 receives the PUSH message over the paging channel, and as a result is able to conduct data communication and conversations over a traffic channel in parallel with the paging channel.

When the mobile terminal 102 receives the PUSH message, it starts up the application corresponding to that PUSH message. In order to conduct data communication using this application, communication is started with the contents server 101 via the PSDN 105 over the traffic channel.

Figure 23:
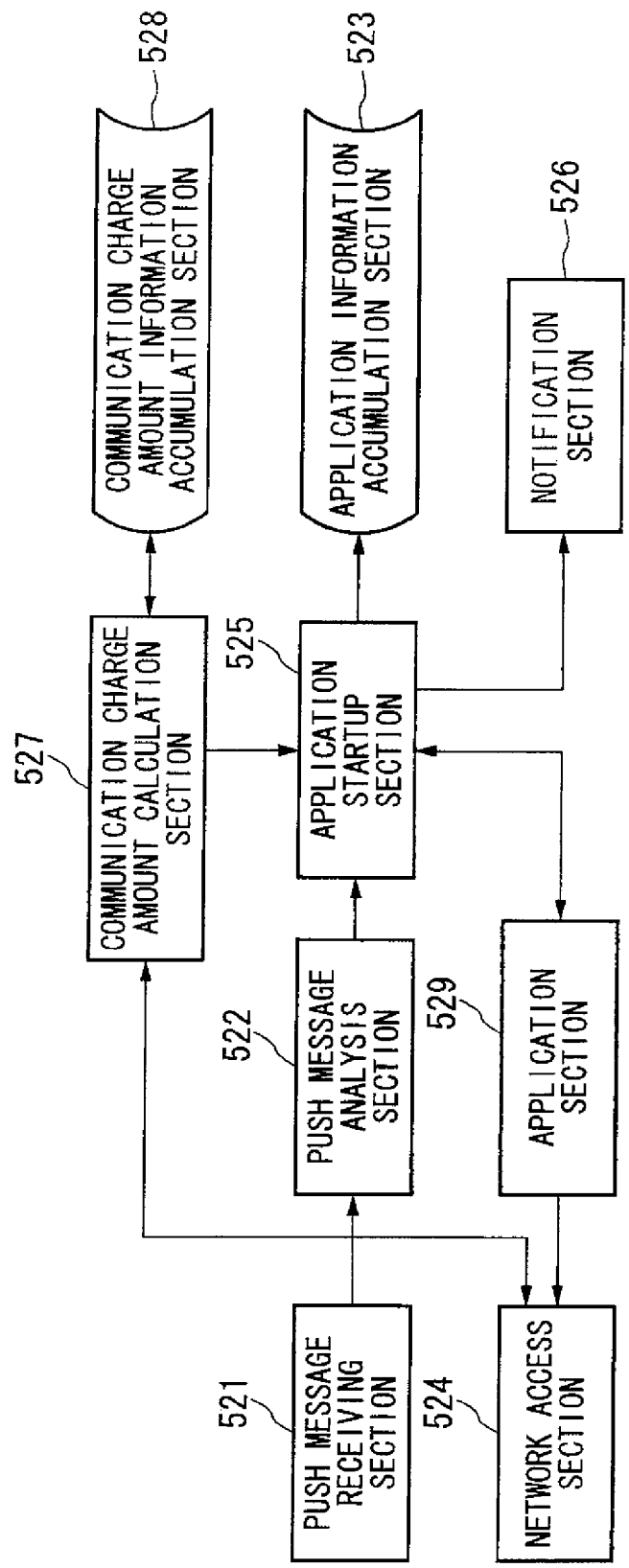
FIG. 23 is a block diagram showing the structure of a mobile communication terminal according to the fourth embodiment of the present invention.
Figure 24A:
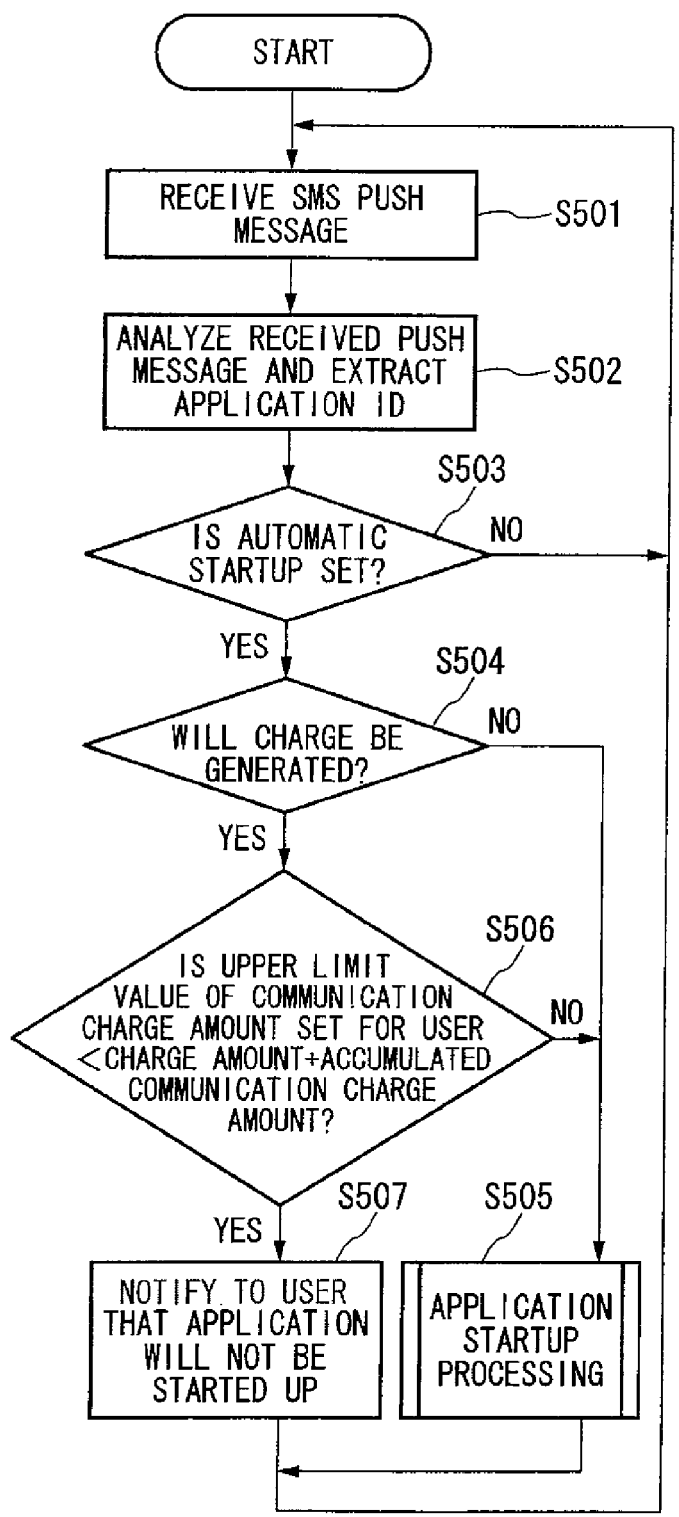
FIGS. 24A and 24B are flowcharts showing an operation of the fourth embodiment of the present invention.
Figure 24B:
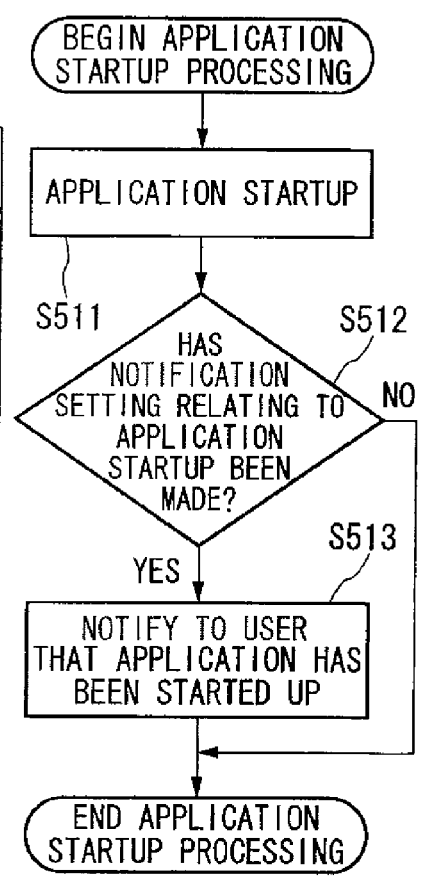

FIG. 23 is a block diagram showing the structure of the mobile terminal 102 serving as a mobile communication terminal according to the fourth embodiment of the present invention. FIGS. 24A and 24B are flowcharts showing an operation of the fourth embodiment of the present invention. The structure and operation of the fourth embodiment will now be described using FIGS. 23, 24A, and 24B.

Firstly, the PUSH message receiving section 521 receives a PUSH message from the SMS server 104 (step S501 in FIG. 24A, hereinafter, the word "step" will be omitted). The contents of the received PUSH message are then analyzed by a PUSH message analysis section 522 (S502), and which application is to be started up is determined. An ID that identifies the application is contained in the PUSH message, and application information that holds this ID and its associated application is stored in advance in an application information accumulation section 523 in the mobile terminal. A plurality of applications are stored in an application section 529.

An example of the structure of application information is shown in FIG. 25.

The application information includes information showing whether or not to automatically start up an application associated with a PUSH message when that PUSH message is received, and information on whether or not a charge will be generated by that application accessing the network using the network access section 524 shown in FIG. 23.

In FIG. 23, an application startup section 525 checks whether or not an application whose startup has been decided can be started up automatically using application information (S503), and if no automatic startup has been set, the application is not started up. At this time, if a setting has been made to make a notification regarding the fact that the application has not been started up automatically, a notification section 526 notifies the user of this fact. On the other hand, if automatic startup has been set, a check is made using the application information as to whether or not use of the contents will incur a charge (S504). If no charge will be incurred, the application is started up (S505). If a notification setting has been made, a notification is made to the user that the application has been started up. If use of the contents will incur a charge, the charge amount is checked.

If use of the contents will incur a charge, the application startup section 525 determines whether or not the sum of the current accumulated communication charge amount added to the charge that will be generated by starting up the application and accessing the network will exceed an upper limit value for the accumulated communication charge amount that is set in advance for the user (S506). If this sum does not exceed the upper limit, the application is started up (S505). If this sum does exceed the upper limit, the application is not started up. At this time, regardless of whether either a setting to notify the user that automatic startup has not taken place has been made or a setting to not notify the user that automatic startup has not taken place has been made, a notification is made to the user by the notification section 526 (S507). As a result, the user is made aware that the accumulated communication charge amount has been reached the upper limit value for the accumulated communication charge amount that has been set and, if necessary, the user is able to use an operation unit (not shown) to perform an action such as raising the upper limit.

Note that the notification section 526 has the function of making a notification to the user by sound, light, screen display, vibration or the like using a speaker, LED, LCD, and vibrator or the like.

FIG. 24B is a flowchart relating to a notification to a user that is made at an application startup.

When an application is started up (S511), a check is made as to whether or not a notification has been set for that application (S512). If a notification has been set, a notification is made to the user that the application has been started up (S513).

FIG. 26 shows a matrix of the relationship between conditions for the notification to a user and application startup conditions.

When an application for which a charge is incurred is started up and data communication is conducted or a service is received, the charge amount is calculated by a communication charge amount calculation section 527, and communication charge amount information is accumulated in a communication charge amount information accumulation section 528. In addition, the accumulated communication charge amount is updated. If the communication charge amount is calculated as a monthly amount, processing is provided to reset the accumulated charge amount at the end of each month.

In some cases, even if the upper limit value of the accumulated communication charge amount is reached, depending on the application, the user does not care the charge amount and continue to acquire the information. To deal with cases such as this, it is possible to add settings such as those described below as attribute values of the application information. For example, a setting in which permission is given for automatic startup and network access for each application, or a setting in which a priority is set for each application depending on the user's preferences and the receiving interval is controlled based on this. Alternatively, it is possible to provide information on the accumulated communication charge amount for each application, and to set an upper limit value for each application. FIG. 27 is an extended example of application information.

It is also possible to make a setting in which, if the upper limit value of the accumulated communication charge amount is reached and automatic startup is not performed, no subsequent PUSH messages are sent by the SMS server 104. Specifically, a transmission halt request is sent to the SMS server 104, and when the user does one of raising the upper limit value of the accumulated communication charge amount and resetting the accumulated communication charge amount, a request to recommence transmissions is sent to the SMS server 104 and the SMS server 104 is permitted to recommence transmissions.

According to the present embodiment, even if a setting has been made so that no notification is made relating to an application startup, if the upper limit value of the communication charge amount has been reached and the application has not started up, by notifying the user of this fact, it is possible to make a distinction between this fact and a normal operation in which there is no automatic startup and to make the user aware that the upper limit value of the communication charge amount has been reached. By making a setting such that, due to the setting of the upper limit of the communication charge amount of the user, an application is not started up by the reception of a PUSH message, even if the rate schedule is a volume dependent charging system, the user is able to keep communication costs below a fixed amount. By not employing automatic startup, resource consumption can be controlled, thereby reducing wear on the battery.

(Fifth Embodiment)

In the present embodiment, when a plurality of unprocessed startup messages are present, a list of applications corresponding to the unprocessed startup messages is created and displayed, and the user is able to select the application the user wishes to start up based on the list displayed on a screen.

Figure 28:
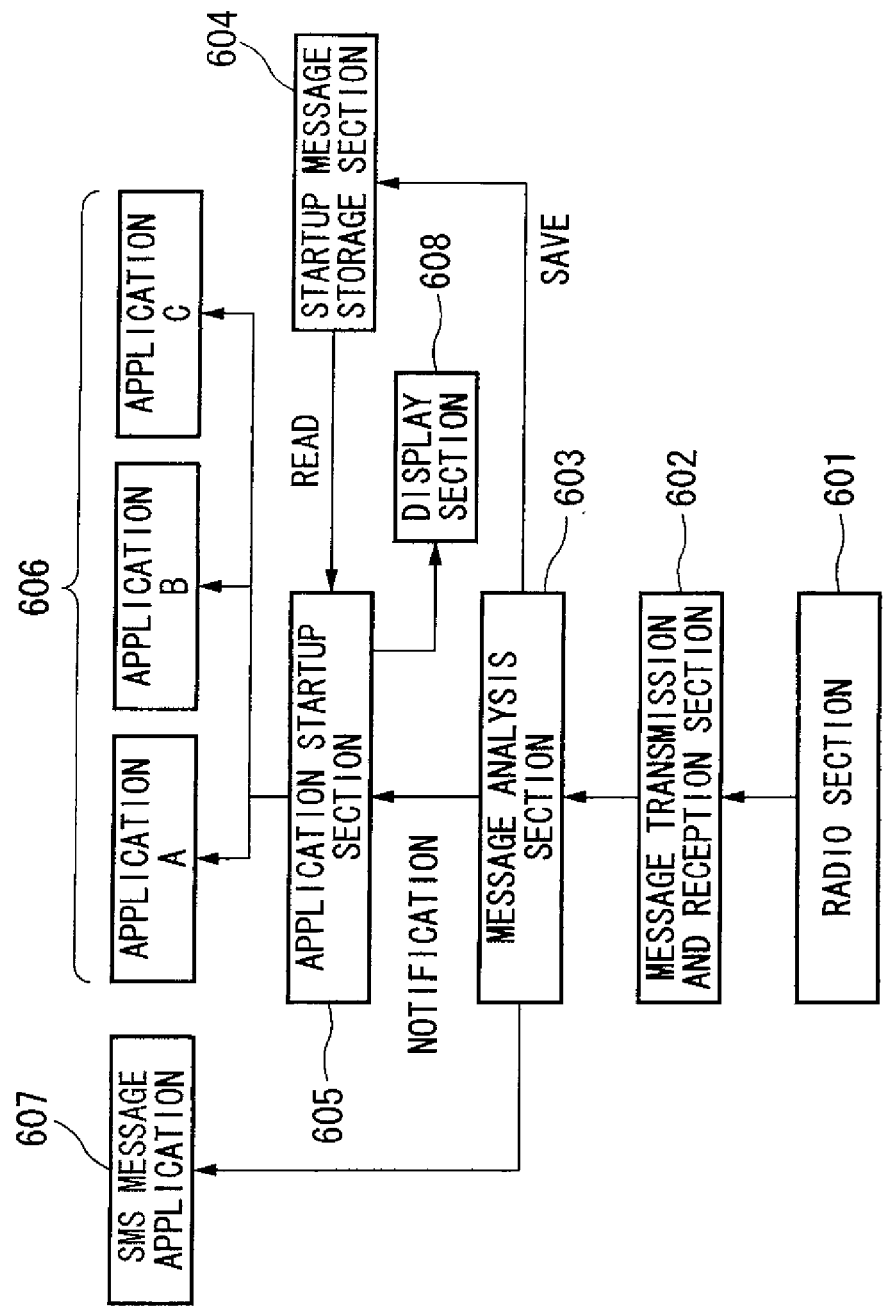
FIG. 28 is a block diagram showing the structure of a mobile communication terminal according to the fifth embodiment of the present invention.

FIG. 28 is a block diagram showing the structure of a mobile communication terminal according to the fifth embodiment of the present invention.

In FIG. 28, a radio section 601 conducts the transmission and reception of data with a server via a radio link.

A message transmission and reception section 602 exchanges SMS message data with servers and other terminals via the radio section 601.

A message analysis section 603 analyzes a received SMS message, and determines whether the received SMS message is a normal SMS message or is an application startup message for a PUSH data delivery service.

A startup message storage section 604 temporarily stores application startup messages.

An application startup section 605 starts up an application in accordance with an application startup message.

Application programs 606, shown as applications A, B, and C, are programs for PUSH data delivery services.

An SMS message application 607 transmits and receives normal SMS message applications. In addition, the SMS message application 607 is used to create mail and to read mail.

A display section 608 displays, for example, messages and various types of data and also displays a list of a plurality of unprocessed startup messages (described below).

In addition to these, although omitted from the drawing, sections that constitute normal mobile telephone functions, for example, an operation section such as a keypad, a control section that controls the overall terminal, and memory and the like are also included in the structure.

Figure 29:
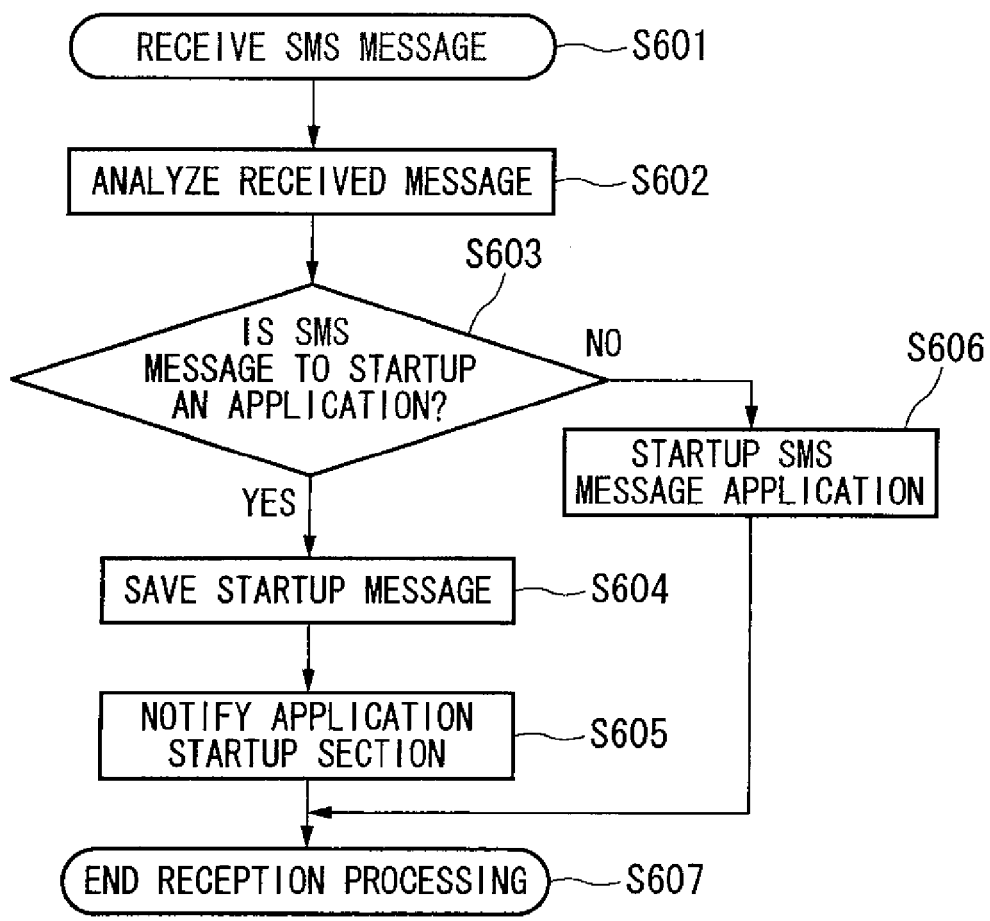
FIG. 29 is a flowchart showing short message reception processing.

Next, a description of the operation when an SMS message is received will be described using the flowchart shown in FIG. 29.

Messages are broadly divided into two types, namely, normal messages for SMS and messages for starting up applications for PUSH delivery services. Distinguishing between messages can be performed by using an identifier contained in the header, or by embedding a code for indicating application startup messages in the front of the message data, and then by using this code. Here, a description is given using an application startup message having the latter format. Specifically, a code for indicating an application startup message is housed in the plurality of bytes (here, taken as N bytes) at the front of the message data, and following this is a code (here, taken as M bytes) that determines the application to be started up, and parameter data that is required for the application to start up.

A message that is sent from a server is transmitted to mobile communication terminal via a radio link. The radio section 601 receives this message and, if it is SMS message data, sends it to the message transmission and reception section 602 (step S601—hereinafter the word "step" is omitted). If the received data is normal data, the message transmission and reception section 602 instructs the message analysis section 603 to analyze the received data (S602). The message analysis section 603 determines whether or not the message is an application startup message from the front N bytes of the message data (S603), and if it is an application startup message, temporarily stores the message data in the startup message storage section 604 (S604). The application startup section 605 is then notified that the message data has been stored (S605). Note that, the startup message storage section 604 is assumed to have an FIFO structure. If the determination in S603 is that the message is not an application startup message, the message data is transferred to the SMS message application 607 and the application is started up (S606).

The reception processing is then ended (S607).

Figure 30:
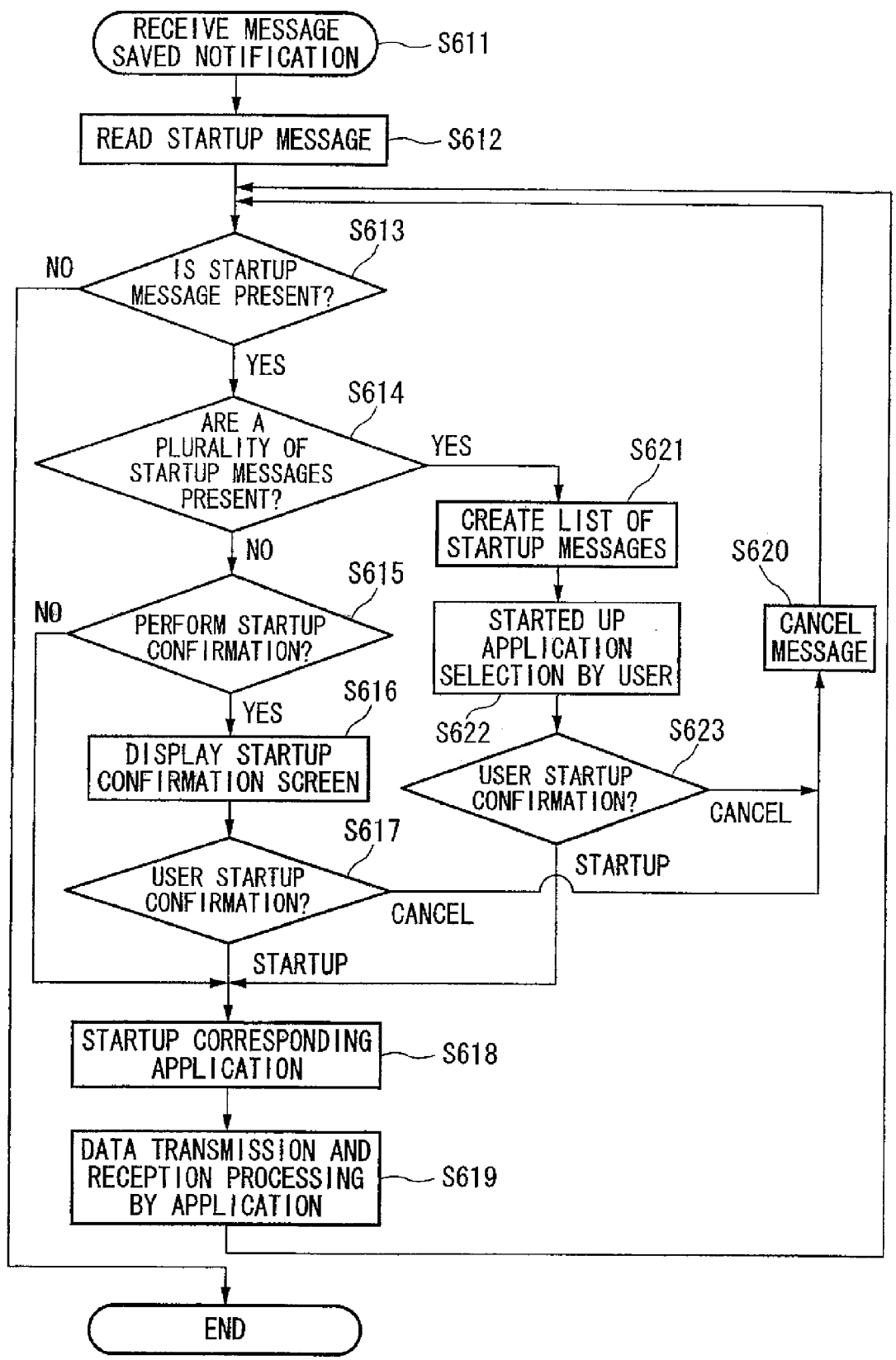
FIG. 30 is a flowchart showing application startup processing.

Next, a description will be given of an operation to start up an application based on a stored start up message using the flowchart shown in FIG. 30.

When the application startup section 605 receives notification from the message analysis section 603 that a message has been stored (S611), it reads the startup message storage section 604 (S612). It then checks whether or not an unprocessed application startup message is present (S613) and, if no such message is present, the processing is ended. If an unprocessed application startup message is present, whether or not a plurality of such messages are present is checked (S614). If one such message is present, a check is made as to whether or not a setting is such that the user confirms the startup of an application (S615).

Applications recorded in a PUSH data delivery service have a setting relating to automatic startup. An automatic startup permitting setting is a setting for starting up an application when an application startup message is received and for then transmitting and receiving data, without requiring a user to perform start-up confirmation. The automatic startup permitting setting is set by a user and is controlled and referred to by the application startup section 605. The application startup section 605 refers to the automatic startup permitting setting, and if the automatic startup permitting setting is ON, executes the corresponding application from among the applications A, B, and C without waiting for startup confirmation from the user (S618).

If, however, the automatic startup permitting setting is OFF, the application startup section 605 displays an application startup confirmation screen on the display section 608 (S616), and waits for startup confirmation from the user (S617). If "startup" is selected, the application startup section 605 executes the corresponding application (S618). Data communication processing with a server is then performed by that application (S619). When this communication is ended, the routine returns to the processing of S613, and whether or not an application startup message is present in the startup message storage section 604 is confirmed. Note that, when the communication is ended and communication resources are released, the application startup section 605 may also delete processed application startup messages from the startup message storage section 604.

If, however, "cancel" is selected in S617, the selected application startup message is deleted (S620), and the routine returns to the processing of S613.

In the aforementioned S614, if a plurality of unprocessed application startup messages are present, the application startup section 605 creates and displays a list thereof (S621). At this time, the names of services and the names of applications corresponding to all of the unprocessed application startup messages are displayed in a list on an application startup confirmation screen. As a result of this display, the user is able to tell at a glance which startup messages are being received.

Figures 31, 37, 38:
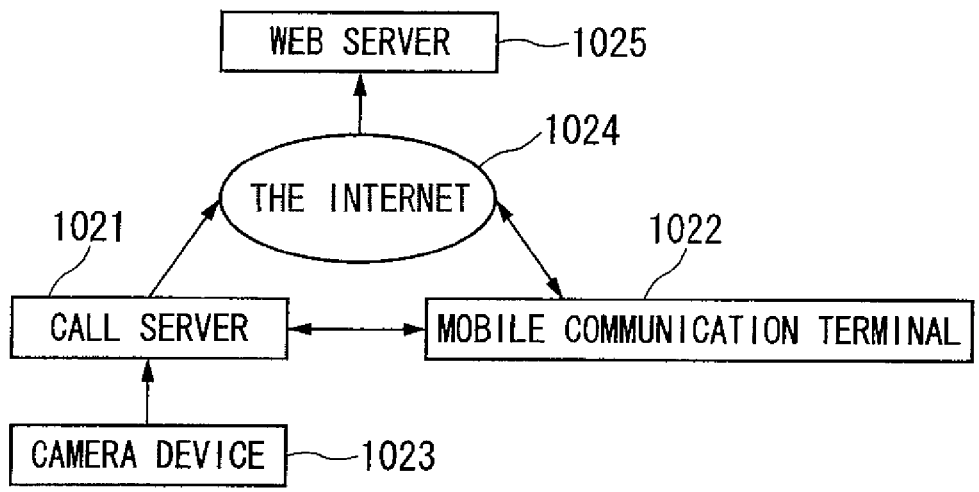
FIG. 31 is a view showing a start up confirmation screen.
FIG. 37 is a block diagram showing the structure when a conventional PUSH data system is used in a crime prevention system.
FIG. 38 is a conceptual view showing the structure of a conventional mobile communication terminal.

FIG. 31 shows an example of a list on a startup confirmation screen that is displayed by the display section 608.

The reception time and the service name or application name are displayed for each application startup message, and are arranged in order from the earliest reception time. If all messages cannot be contained on a single screen, all the messages can be viewed by scrolling or the like. Commands corresponding to soft keys are displayed below the screen, and it is possible to start up or cancel a selected application by pressing the corresponding soft key.

Next, when the user selects one application from the startup confirmation screen shown in FIG. 31 (S622), the application startup confirmation screen is displayed and startup confirmation from the user is awaited (S623). If "startup" is selected, the corresponding application is run (S618). If "cancel" is selected, the selected application startup message is cancelled (S620), and the routine returns to the processing of S613.

Once one application startup message has been processed, conformation is made as to whether or not an unprocessed application startup message is present in the startup message storage section 604 (S613). If an unprocessed message is present, the above-described processing is repeated. If no unprocessed messages are present, the application startup section 605 ends the processing and prepares for the next message reception.

According to the mobile communication terminal of the present embodiment, if a plurality of application startup messages are received simultaneously or substantially simultaneously, it is possible to display which messages are being received in a list, thereby enabling the user to decide the sequence in which the applications will be started up (i.e., processed). As a result the user is able to begin processing from the message to which the user allocates the highest priority, thereby enabling a PUSH data delivery service that is extremely convenient for the user to be provided.

Note that it is also possible to employ a structure in which a degree of priority in addition to an automatic startup permitting setting can be set for applications recorded in a PUSH data delivery service. The degree of priority may be either two-stage, such as high or normal, or maybe three-stage such as high, medium, or low.

In this case, the application startup section 605 refers to this degree of priority information when creating a list of startup applications, and operates so as to display applications having a high degree of priority at the top of the list.

The reason for this is in order to avoid problems such as the following. For example, if a large number of application startup messages are received simultaneously or substantially simultaneously so that they cannot be displayed on one screen of the startup confirmation screen, notifications having a high degree of priority for a user, for example, notifications that are extremely important from a security point of view such as a notification of a malfunction in a crime prevention system may become buried in other notifications, and might not be noticed by the user.

By employing the above-described structure, even if a plurality of application startup messages are received simultaneously or substantially simultaneously, the user is able to rapidly access information to which the user allocates a high priority, thereby further increasing the convenience for the user.

Note that, in the present embodiment, if there is no startup instruction from the user relating to the application list displayed, applications that are permitted to start up automatically are processed in accordance with their order on the list. In addition, the degree of priority may also be used as the order for automatic startup.

(Sixth Embodiment)

In the present embodiment, the elapsed time between when a key is released until it is pressed is measured when a user is repeatedly pressing and releasing an operation key in order to play a game or create an e-mail. When a notification is made that an incoming signal has arrived, if the elapsed time immediately prior to the arrival of the incoming signal is below a threshold value, it is determined that a game is being played or that an e-mail is being created and a notification relating to the arrival of the incoming signal is not displayed.

FIG. 32 is a block diagram showing the structure of the mobile telephone serving as an example of a mobile communication terminal according to the sixth embodiment of the present invention.

In FIG. 32, a radio device 701 is a unit for achieving the functions of a mobile telephone, and has been formed into modules. An OS 703 exchanges information with the radio device 701 via a radio device driver 702. In addition, the OS 703 is linked to a display driver 707 and a key driver 710 and controls a display section 708 such as a liquid crystal display and a key device 709. The OS 703 is also provided with a draw application program interface (API) 706, and controls the display of information on the display section 708 by an application.

If an application is in the foreground of the screen, the application receives notification of a key event from the OS 703, and receives notification that a user has operated an operation key on the key device 709. When an incoming signal has arrived, a first application 705 appears on the screen and notifies the user of the arrival. At this time, if a caller number has also been notified, this caller number is displayed and a ring tone is sounded. A second application 712 is a game started up by the user.

Here, it is assumed that the second application 712 has been started up in order for the user to play a game while waiting for an arrival of an incoming signal. The user repeatedly hits the operation keys on the key device 709 at a rapid pace. This key event is notified to the second application 712 via the key driver 710, a key monitoring section 711, and the OS 703. The key monitoring section 711 is provided with a counter for measuring time, and drives the counter using clocks having a predetermined frequency.

Figure 33:
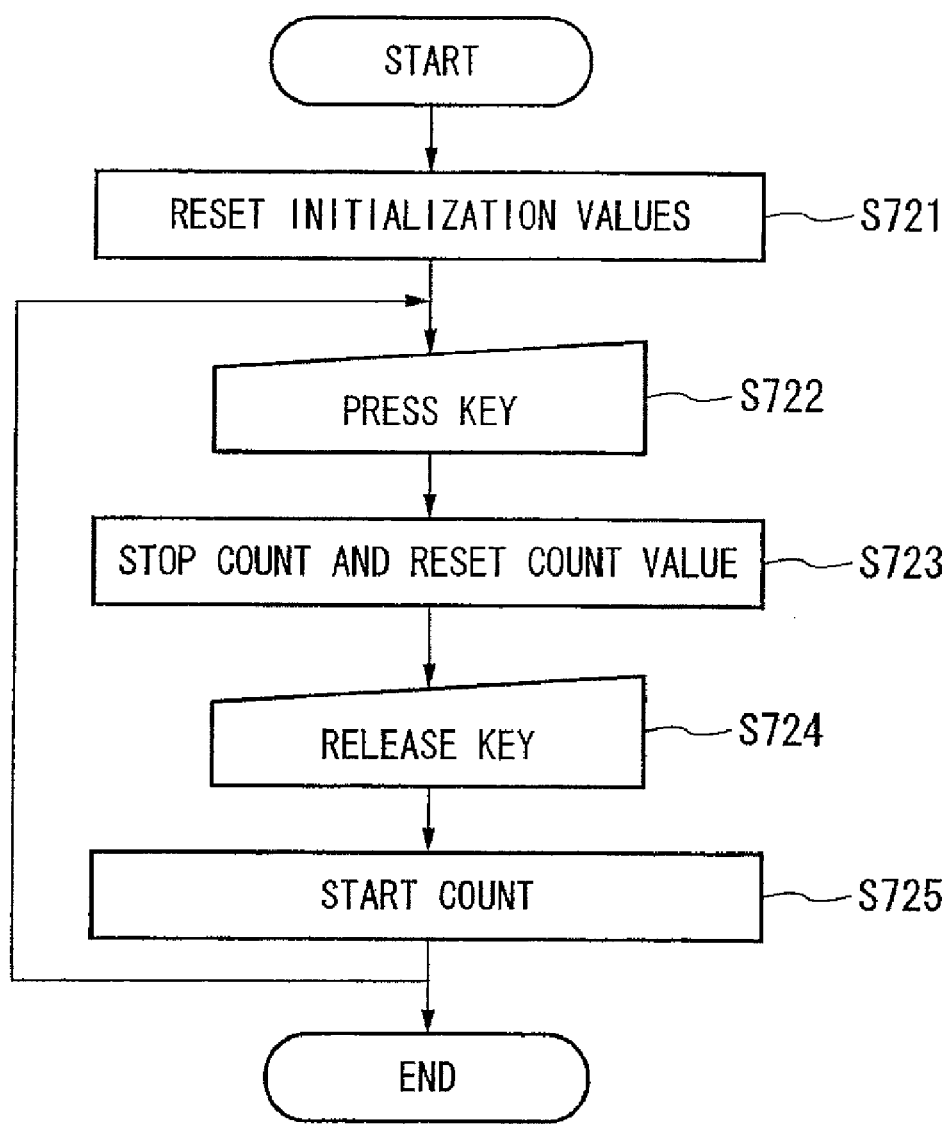
FIG. 33 is a flowchart showing an operation of a key monitoring section.

FIG. 33 shows the processing flow of the key monitoring section 711.

After initialization (step S721—hereinafter, the word "step" is omitted), when the key driver 710 notifies that an operation key has been pressed (S722), the counting of the counter is stopped and the counter is reset to zero (S723). When the key driver 710 then further notifies that the operation key has been released (S724), the counter is started (S725).

While the operation key is being repeatedly pressed and released, if an inquiry about the elapsed time since the release of the operation key is received by the OS 703, the value of the counter is read and is notified. Accordingly, while the operation key is being pressed, the counter value read is always zero.

Next, it will be assumed that an incoming signal arrives while the second application 712 is being run. The radio device 701 detects the arrival of the incoming signal and generates an interruption. The radio device driver 702 detects this interruption, and the OS 703 starts an operation of an incoming signal arrival response processing module 704. The incoming signal arrival response processing module 704 determines whether the arrived incoming signal is a telephone call, a short message or an e-mail, and determines various other conditions such as whether or not the mobile telephone is currently in manner mode, or whether a setting has been made to refuse arrivals of incoming signals, and starts up a suitable first application 705.

The first application 705 attempts to acquire authority to draw on the display section 708 using the draw API 706. The OS 703 detects that the request for draw authority has been made as a result of the arrival of an incoming signal, and makes an inquiry to the key monitoring section 711 about the elapsed time from the release of the operation key. In reply, the key monitoring section 711 sends the value of the counter to the OS 703. If the elapsed time is equal to or greater than a predetermined threshold value, for example, one second, the OS 703 immediately receives the request from the first application 705. As a result, a display notifying of the arrival of the incoming signal is drawn on the screen of the display section 708.

If, however, the counter value is less than a predetermined threshold value, it is determined that the user is playing a game and, without sending a response to the request for drawing authority, it is decided to temporarily not display the incoming signal arrival notification. At this time, the OS 703 starts up the timer for that portion of time by which the elapsed time was less than the threshold value, and in a time out event, makes a new inquiry to the key monitoring section 711 as to the elapsed time since the release of the operation key. This action is then repeated. As a result, during the time that the user is continuing the game and is repeatedly hitting the operation keys, it is possible to delay a notification of the arrival of an incoming signal for a lengthy period of time without the elapsed time since the release of the operation key going above the threshold value. If the operation of the operation key by the user stops, the incoming signal arrival notification makes an interruption and is displayed on the screen. However, at this time, because the desire of the user to continue the operation has already ended, no erroneous operation is made by the user. Moreover, it is also possible to reduce the extent of the feelings of annoyance or surprise that arise when performing an operation (i.e., an interruption to the display on the screen) that is contrary to the operational desire of the user is performed.

In the present embodiment, the first application 705 is an application used to notify of an incoming signal arrival, however, it may be an application that executes other types of processing. Namely, if a short message arrives, the incoming signal arrival response processing module 704 is able to start up the associated application as the first application 705 based on an identifier that is contained within the short message. Examples of this type of short message service (SMS) include applications in which the arrival of an e-mail at a center is notified by SMS, a mail application is started up in response to the arrival of the SMS message, and this mail application is made to receive the mail from the center. Alternative examples include an application in which a contract is entered into with a specific content provider, and by notifying a user as to the commencement of a new contents service by an SMS message, the user is allowed to start that service immediately.

Figure 34:
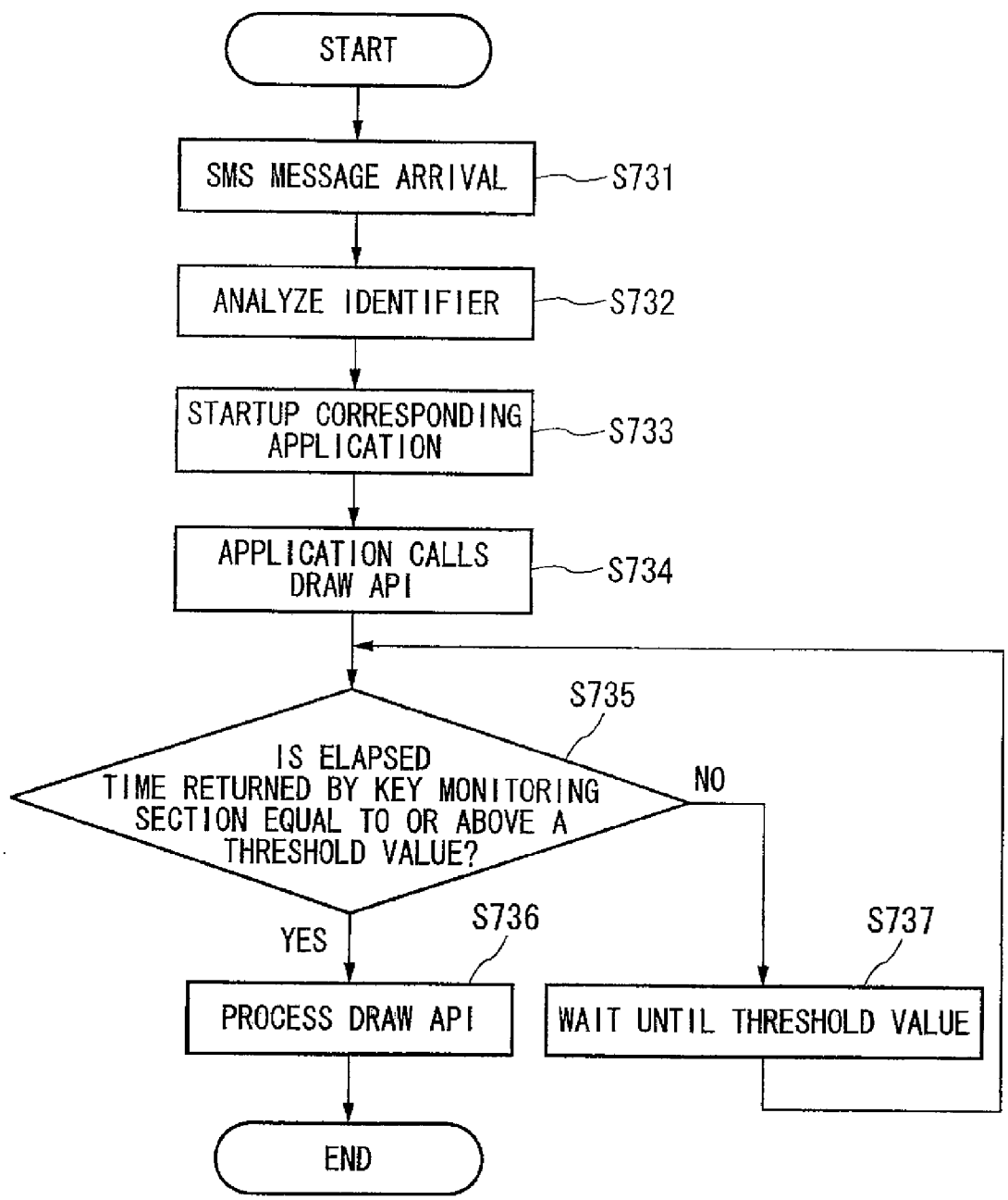
FIG. 34 is a flowchart showing an operation relating to an application startup based on an SMS message arrival.

FIG. 34 is a flowchart showing the processing when an application startup is instructed by the arrival of an SMS message.

When an SMS message arrives (S731), the identifier contained in the message is analyzed (S732), and the application that corresponds to that identifier is started up (S733), and the application calls the draw API 706 (S734). At this time, a check is made as to whether or not the counter value is equal to or more than the threshold value (S735), and if the counter value is equal to or more than the threshold value draw processing is conducted (S736). If the counter value is less than the threshold value, then the drawing is performed after the counter value has reached the threshold value (S737).

Examples of the first application 705 include applications that request drawing authority to the display section 708 as well as applications that perform processing in the background. The effects of the present invention are able to be achieved regardless of the type of application provided that the application requests drawing authority. Moreover, in the present embodiment, because an OS 703 delays the request for the drawing authority, in the same manner as the first application 705, the effects of the present embodiment can be obtained when a need arises for the OS 703 itself to display a notification to the user. For example, if an attempt is made to start up the first application 705, but it cannot be started up due to insufficient resources such as memory, then the incoming signal arrival response processing module 704 may display an error message.

(Seventh Embodiment)

In the present embodiment, a monitoring section monitors whether or not unset characters are displayed during a character input operation, and when a notification relating to the arrival of an incoming signal is displayed, an inquiry is made to the monitoring section as to whether or not unset characters are being displayed. If the response to this inquiry is that they are being displayed, then the display of the notification is prohibited.

Figure 35:
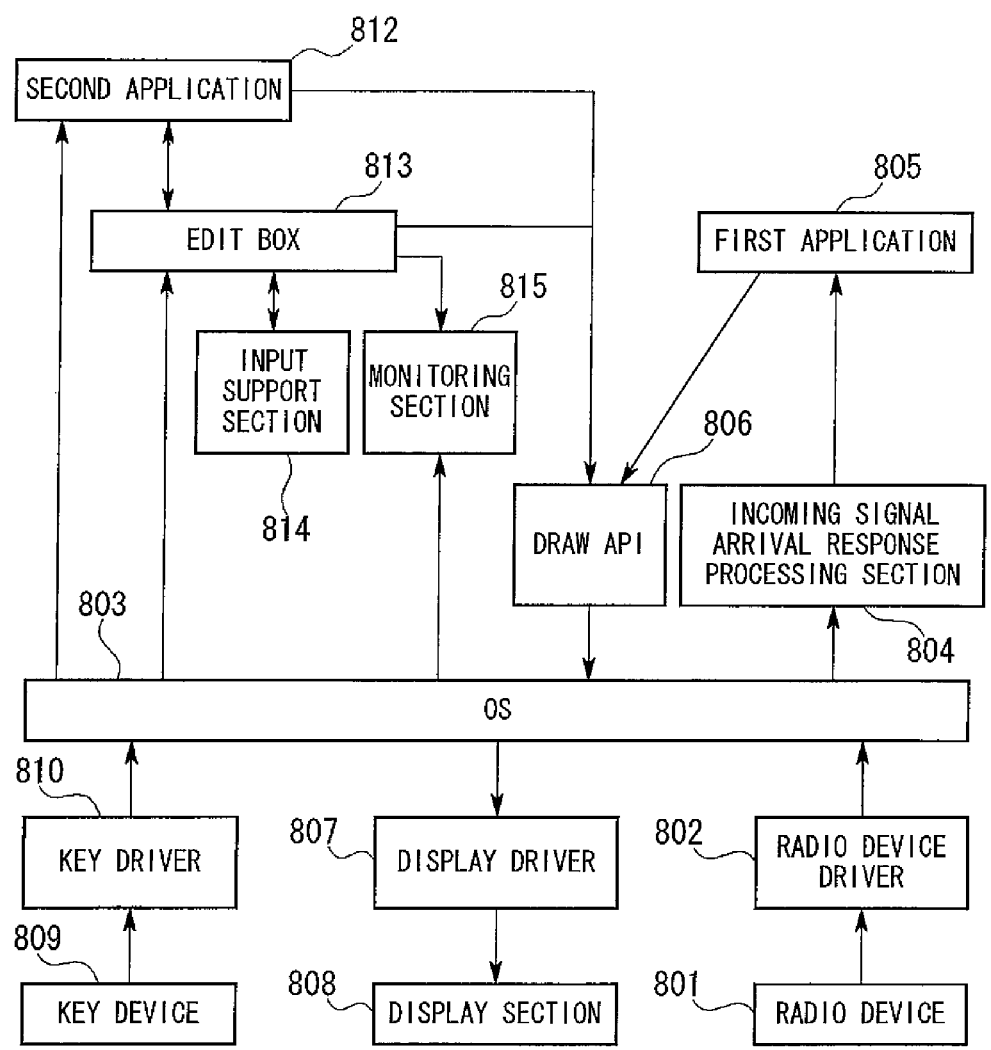
FIG. 35 is a block diagram showing a mobile telephone according to the seventh embodiment of the present invention.

FIG. 35 is a block diagram using as an example the mobile telephone according to the seventh embodiment of the mobile communication terminal of the present invention.

Figure 40:
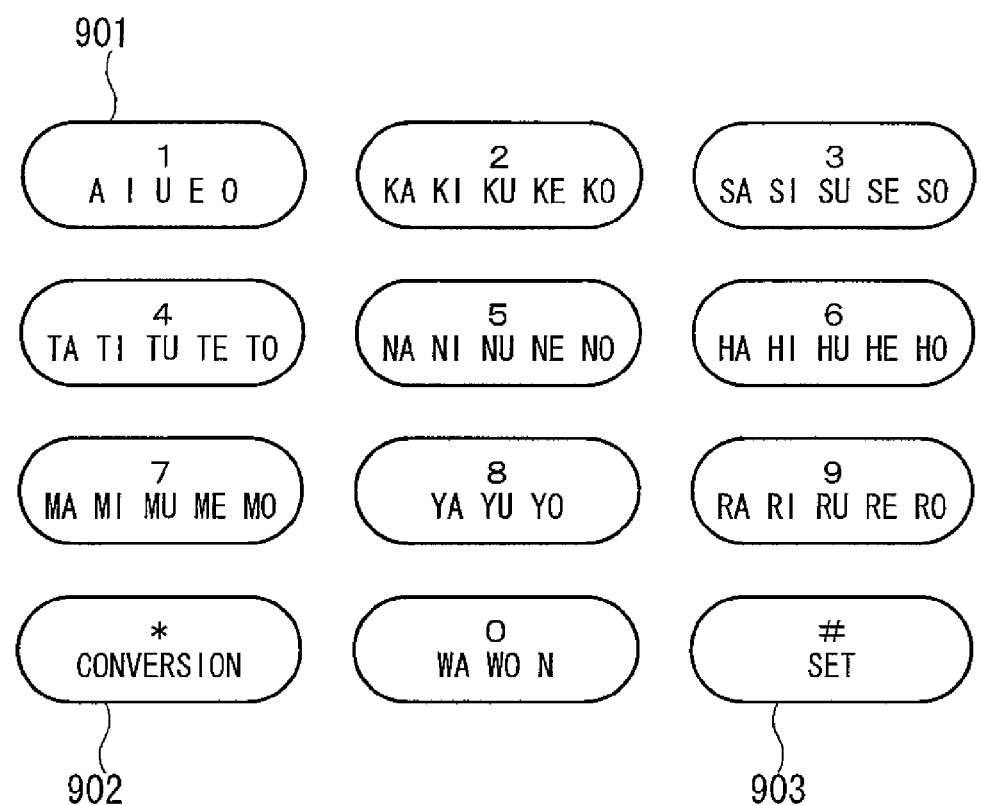
FIG. 40 is a structural view showing the key layout of a mobile telephone to which the present invention can be applied.
Figure 41:
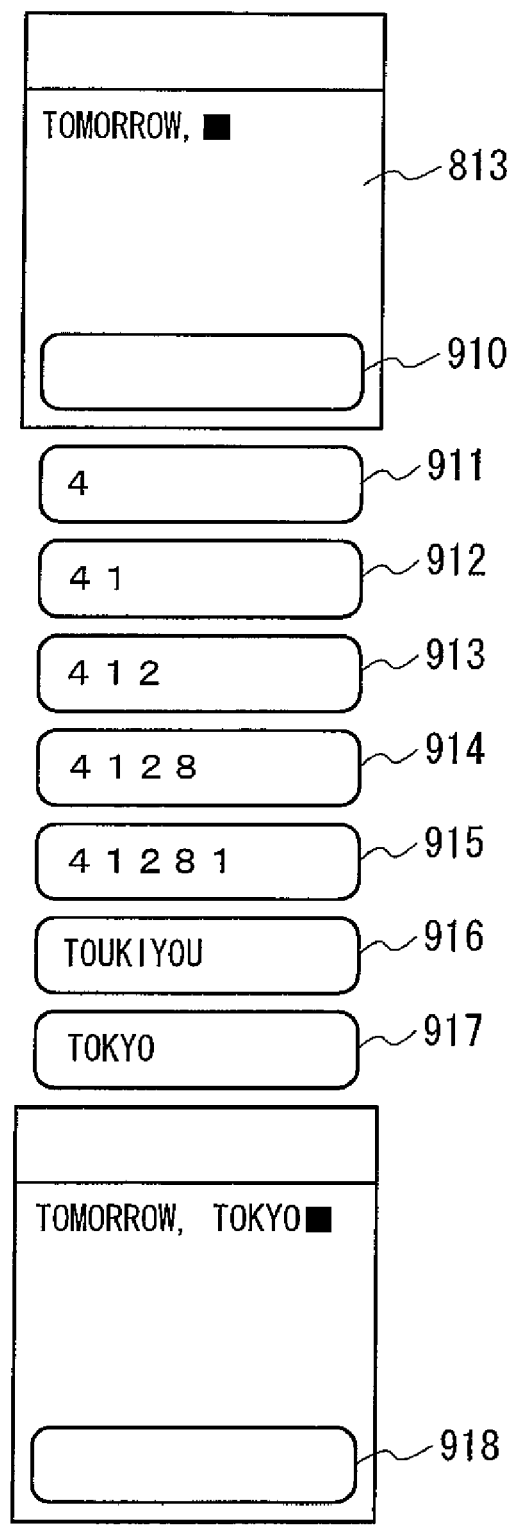
FIG. 41 is a structural view showing a screen transition based on a character string input operation to which the present invention can be applied.

Note that, in the present embodiment, a key device 809 shown in FIG. 35 has the key layout shown in FIG. 40, and a character string input operation is conducted in accordance with a procedure that conforms to the screen transition shown in FIG. 41.

In FIG. 35, a radio device 801 is a unit for implementing the functions of a mobile telephone terminal, and has been formed into modules. An OS 803 exchanges information with the radio device 801 via a radio device driver 802. In addition, the OS 803 is linked to a display driver 807 and a key driver 810 and controls a display section 808 such as a liquid crystal display and a key device 809. The OS 803 is also provided with a draw API 806, and controls displays of information on the display section 808 such as a liquid crystal display by a first application 805 and a second application 812.

If an application is in the foreground of the screen, the application receives notification of a key event from the OS 803, and receives notification that a user has operated the key device 809. When an incoming signal has arrived, the first application 805 appears on the screen and notifies the user of the arrival. At this time, if a caller number has also been notified, this caller number is displayed and an incoming signal arrival tone is sounded. The second application 812 is a character input application started up by the user.

Here, it is assumed that the second application 812 has been started up in order for the user to input a text while waiting for the arrival of an incoming signal. When the second application 812 is displayed on the screen, an edit box 813 is displayed therein. The edit box 813 is a common component belonging to the OS 803, and receives character input from the user. When the user selects the edit box 813, a key event is delivered to the edit box 813. The edit box 813 is further linked to an input support section 814 that searches for candidate character strings based on this key event, and supplies them to the edit box 813. Hereinafter, in the present embodiment, a description will be given using characters as an example.

For example, if a user inputs "41281" using the keys, the edit box 813 displays "41281" on the screen. Subsequently, when the user presses the conversion key 902, the edit box 813 notifies the input support section 814 about this key event. The input support section 814 searches for candidates, then selects the katakana alphabet character string for "TOUKIYOU" and supplies this to the edit box 813. The edit box 813 uses the draw API 806 to display the katakana alphabet character string for "TOUKIYOU" on the screen. At this time, the edit box 813 registers in the monitoring section 815 the fact that the edit box 813 itself is in the foreground and is displaying an unset character string.

When the user presses the set key 903, this key event is delivered to the edit box 813 and is further notified to the input support section 814. The input support section 814 then notifies the edit box 813 that the character string has been set. The edit box 813 then stores the set character string and also deletes the registration in the monitoring section 815 as to the fact that a character string candidate is being displayed. In addition, when the key focus moves outside the edit box 813, the unset character string is forcibly set and notification of the deletion is delivered to the monitoring section 815. Moreover, because the key focus also moves outside the edit box 813 if the second application 812 appears in the background, the same type of deletion notification is delivered to the monitoring section 815.

As a result, even if a plurality of applications for performing character input are started up, and a plurality of instances of the edit box 813 and the input support section 814 are present, because information is collected in the monitoring section 815, it is possible to accurately determine whether or not character string candidates are currently being displayed on the screen.

It will be assumed that an incoming signal arrives while the edit box 813 of the second application 812 is still displaying an unset character string on the display section 808. The radio device 801 detects the arrival of the incoming signal and generates an interruption. The radio device driver 802 detects this interruption, and the OS 803 causes an incoming signal arrival response processing section 804 to execute incoming signal arrival response processing. The incoming signal arrival response processing section 804 identifies whether the arrived incoming signal is a telephone call, a short message or an e-mail, and determines various other conditions such as whether or not the mobile telephone is currently in manner mode, or whether a setting has been made to refuse arrivals of incoming signals, and starts up a suitable first application 805 to give notification of the arrival of the incoming signal.

The first application 805 attempts to acquire authority to draw on the display section 808 using the draw API 806. The OS 803 detects that the request for draw authority has been made as a result of the arrival of the incoming signal, and instructs the monitoring section 815 to determine whether or not an unset character string is being displayed. If the monitoring section 815 replies that unset character strings are not being displayed, the OS 803 immediately accepts the request from the first application 805, and a display notifying of the arrival of the incoming signal is drawn on the screen of the display section 808.

If, however, the monitoring section 815 replies that an unset character string is currently being displayed, without sending a response to the request for drawing authority, it is decided to temporarily not display the incoming signal arrival notification. At this time, in order to notify the user that an incoming signal has arrived, it is possible to execute a notification operation using a notification unit (not shown) such as causing either an LED to flash on and off, sounding a predetermined notification melody, or starting up a vibrator.

When the user presses the set key 903 so as to instruct that the character string be set, the monitoring section 815 replies to the inquiry from the OS 803 that an unset character string is not being displayed. As a result, the OS 803 starts up a timer at a predetermined time interval and begins polling the monitoring section 815. When the monitoring section 815 replies that unset character strings are not being displayed, resources are allocated to the request of the first application 805 and authority is granted to draw on the display section 808.

Alternatively, it is also possible for the notification to be displayed after a predetermined time has passed from the prohibiting of the display of the incoming signal arrival notification.

(Eighth Embodiment)

In the seventh embodiment, the first application 805 notifies of the arrival of an incoming signal. In contrast, in the present embodiment, the first application will be several applications that execute particular processing. Namely, when a short message arrives that instructs the start up of an application, the incoming signal arrival response processing section 804 determines the identifier contained within the short message, select an application that is associated with this identifier, and start up this application as the first application 805.

Examples of this type of short message service (SMS) include applications in which the arrival of an e-mail at a center is notified by SMS message, a mail application is started up in response to the arrival of the SMS message, and this mail application is made to receive the mail from the center. Alternative examples include an application in which a contract is entered into with a specific content provider, and by notifying a user as to the commencement of a new contents service by SMS message, the user is allowed to start that service immediately. Examples of the first application 805 include applications that request drawing authority to the display section 808 as well as applications that perform processing in the background.

The effects of the present invention are able to be achieved regardless of the type of application provided that the application is able to make a display on the display section 808.

Figure 36:
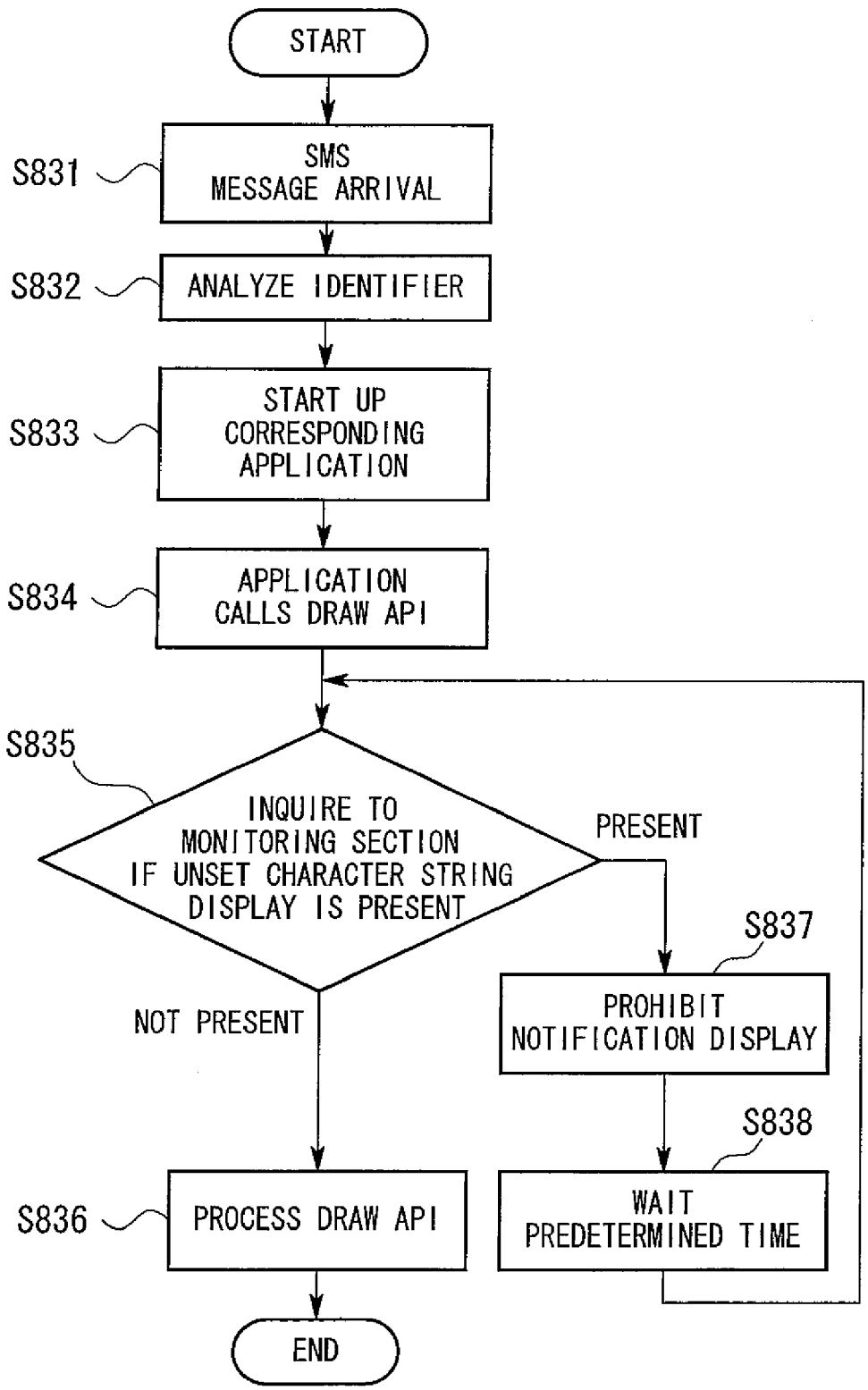
FIG. 36 is a flowchart showing an operation of the mobile telephone according to the eighth embodiment of the present invention.
Figure 39:
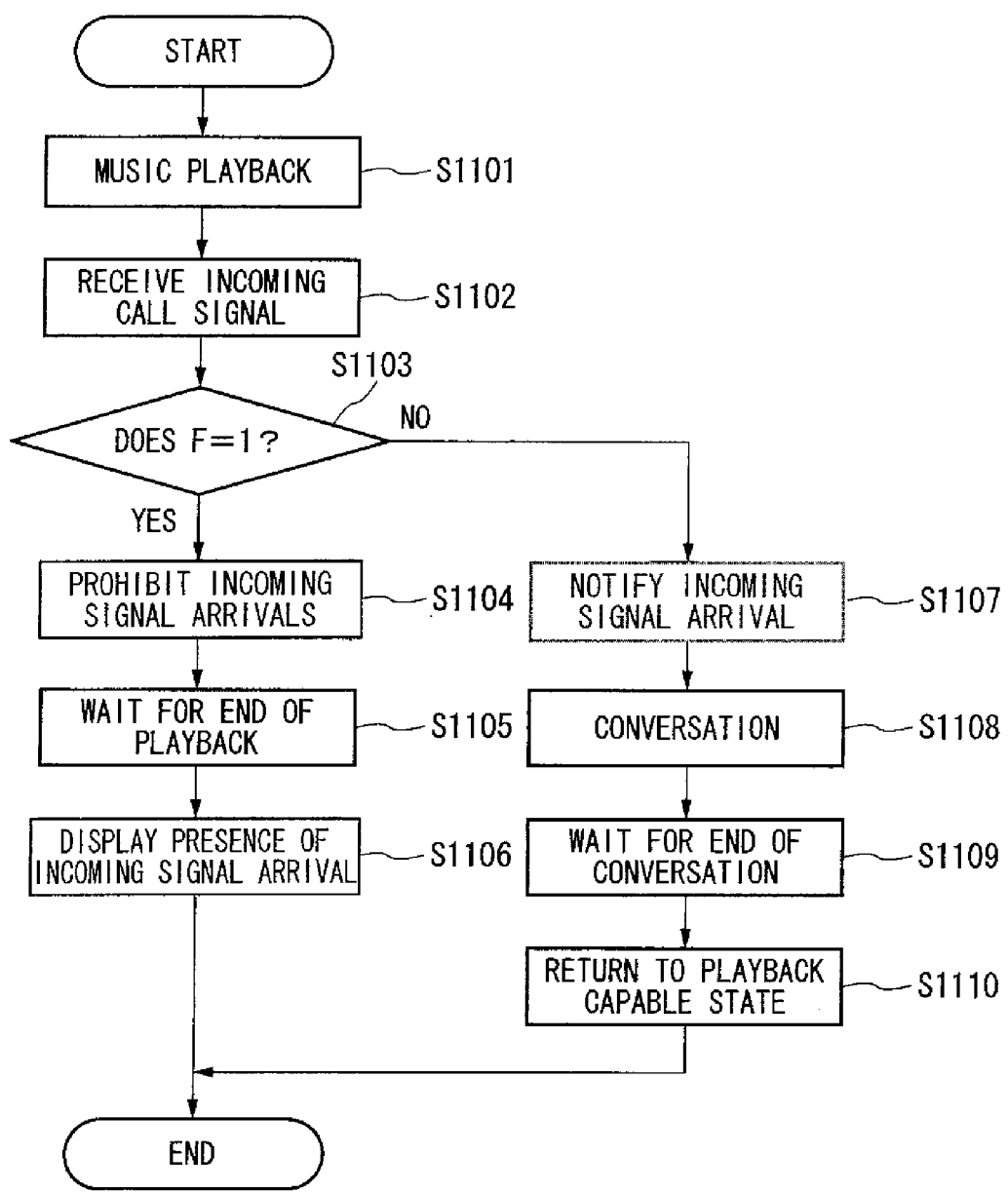
FIG. 39 is a flowchart showing an operation of a conventional mobile telephone.

FIG. 36 is a flowchart showing the operation of the eighth embodiment according to the present invention.

When an SMS message arrives (step S831—hereinafter the word "step" is omitted), the identifier contained within the message is analyzed (S832). The application that corresponds to that identifier is then selected and is started up as the first application 805 (S833). This first application 805 then calls the draw API 806 (S834). At this time, an inquiry is made to the monitoring section 815 as to whether or not an unset character string is already being displayed on the display section 808 (S835). If they are not being displayed, draw processing is conducted (S836). If an unset character string is already being displayed, the draw processing is prohibited (S837), and after a predetermined time (alternatively, after the character string has been set), a drawing relating to the notification is made (S838).

Note that, in the seventh and eighth embodiments, because an OS 803 delays the request for the drawing authority, in the same manner as the first application 805, the effects of the present embodiment can be obtained when a need arises for the OS 803 itself to display a notification to the user. For example, if an attempt is made to start up the first application 805, but it cannot be started up due to insufficient resources such as memory, then the incoming signal arrival response processing section 804 may display an error message.

According to the present embodiment, because notification of the arrival of an incoming signal is not displayed when an unset character string (for example, the character strings shown in any of states 911 to 917 in FIG. 41) is being displayed on the display section 808 during a character string input operation, the effect is obtained that an incoming signal arrival notification does not interrupt and be displayed until the user performs a setting operation. As a result, after a telephone conversation has ended, and the screen has returned to the original character input screen, it is possible to start again from the next character input, and the work that has been performed up until partway through a character string input operation does not become wasted. Furthermore, it is possible to provide a mobile telephone that is comfortable to use without causing any feeling of annoyance that may arise if the concentration of the user on an input operation is interrupted.

Next, the program and the recording medium on which the program is recorded of the respective embodiments of the present invention will be described.

A program that enables a CPU of a computer system to execute processing that is based on the structures according to each embodiment of the present invention and processing according to the flowcharts shown in each embodiment of the present invention forms the program of the present invention.

A recording medium on which this program is recorded forms the recording medium that is readable by computer according to the present invention. Examples of recording media that can be used include magneto-optical disks, optical disks, semiconductor memory, magnetic recording media, and the like. These may be used in the form of ROM, RAM, a CD-ROM, a flexible disk, a memory card, or the like.

Among these recording media are also included media that hold programs for a fixed time such as volatile memory such as the internal RAM of a computer system serving as a server and clients when the program is transmitted via a communication line such as a telephone line or a network such as the Internet.

This program may also be transferred from a computer system that is storing the program on the storage device or the like to another computer system via a transmission medium or by a transmission wave within the transmission medium. This transmission medium refers to a medium having a function of transferring information such as a communication line such as a telephone line or a network such as the Internet.

Moreover, this program may be formed by a plurality of programs for achieving the above-described functions. Alternatively, the program may be intended to a portion of the above-described functions. Furthermore, the program may be what is known as a differential file (i.e., a differential program) that is able to achieve the above-described functions by being combined with a program that is already recorded on the computer system.

Accordingly, it is also possible to obtain the same functions and effects as those functions and effects described in each of the above embodiments, and to thereby solve the problems of the present invention by using this program and recording medium in a system or apparatus that is different from a system or apparatus that is based on the embodiments of the present invention, and by the computer of this system or apparatus executing the program.

Note that the mobile communication terminal includes a mobile telephone, a mobile information device that incorporates a communication section, and a mobile information device to which a communication card can be attached.

In addition, the determination, startup, monitoring, measurement, calculation, and analysis, etc. described in the aforementioned embodiments can be executed by a control section (for example, central processing unit), an electronic circuit, and so forth.

The above is a description of embodiments of the present invention with reference made to the drawings, however, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A mobile communication terminal comprising:
   a display section that displays a notification of an arrival of an incoming signal or a notification that is generated as a result of the arrival of an incoming signal; and
   a control section that measures an elapsed time since the release of a key by a user, and, when the arrival of the incoming signal has occurred, controls a display of the notification on the display section based on the elapsed time measured,
   wherein, when the elapsed time measured reaches a predetermined threshold value, the control section displays the notification using the display section.

2. The mobile communication terminal according to claim 1, wherein the arrival of the incoming signal is the arrival of a message, and the notification that is generated as a result of the arrival of the incoming signal is a notification that relates to an application that is started up in accordance with information in the message.

3. A computer program stored in a non-transitory computer readable storage medium of a mobile communication terminal that executes on a computer:
   a display process that displays a notification of an arrival of an incoming signal or a notification that is generated as a result of the arrival of an incoming signal;
   a key monitoring process that measures an elapsed time since the release of a key by a user; and
   a control process that, when the arrival of the incoming signal has occurred, controls the display process of the notification based on the elapsed time measured by the key monitoring process;
   wherein, when the elapsed time measured by the key monitoring process reaches a predetermined threshold value, the control process controls the display process of the notification.

4. The program according to claim 3, wherein the arrival of the incoming signal is the arrival of a message, and a notification that is generated as a result of the arrival of the incoming signal is a notification that relates to an application that is started up in accordance with information in the message.

* * * * *